Figure 6:
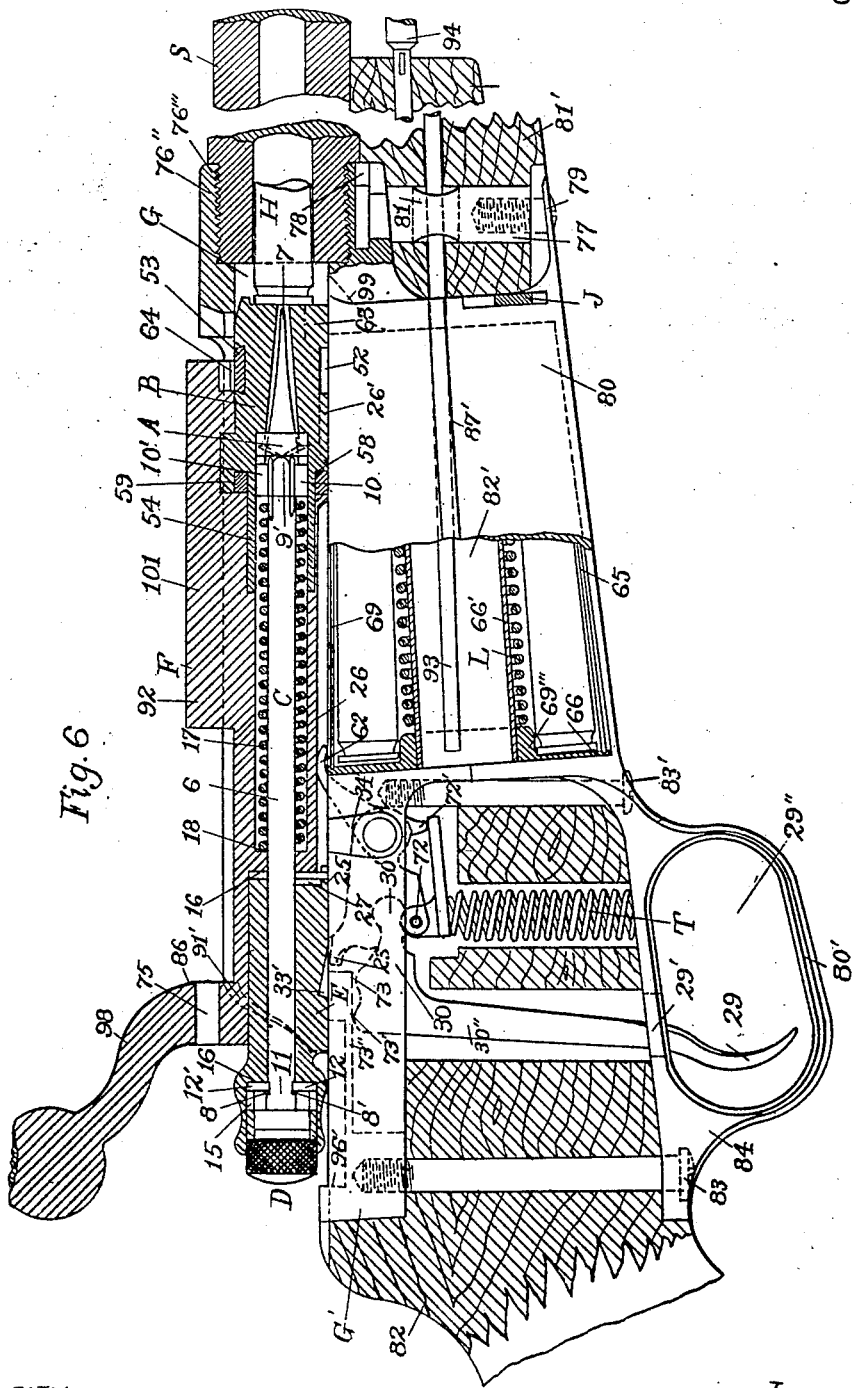

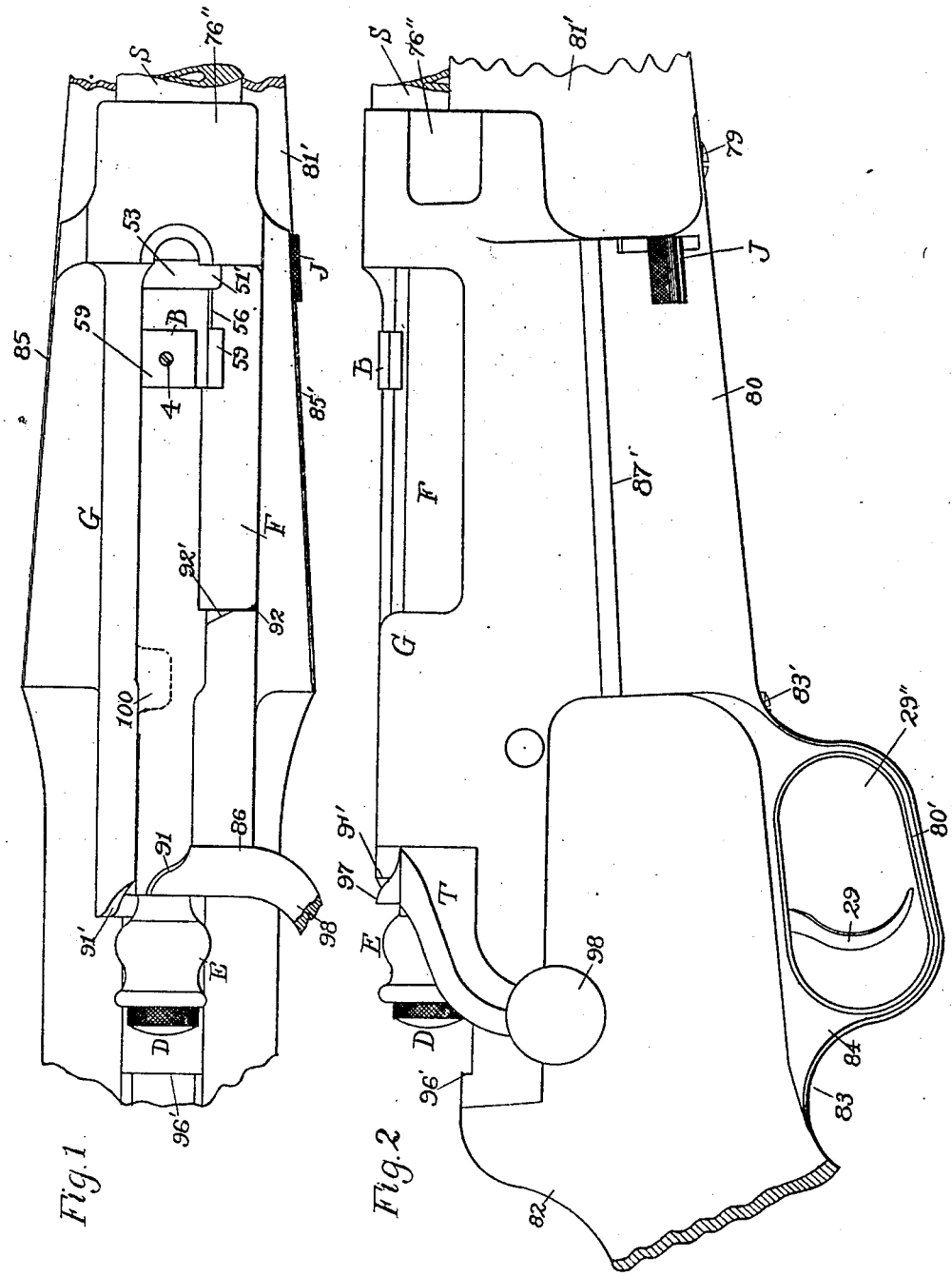

(No Model.) 12 Sheets—Sheet 2.
M. H. DURST.
MAGAZINE GUN.
No. 502,812. Patented Aug. 8, 1893.
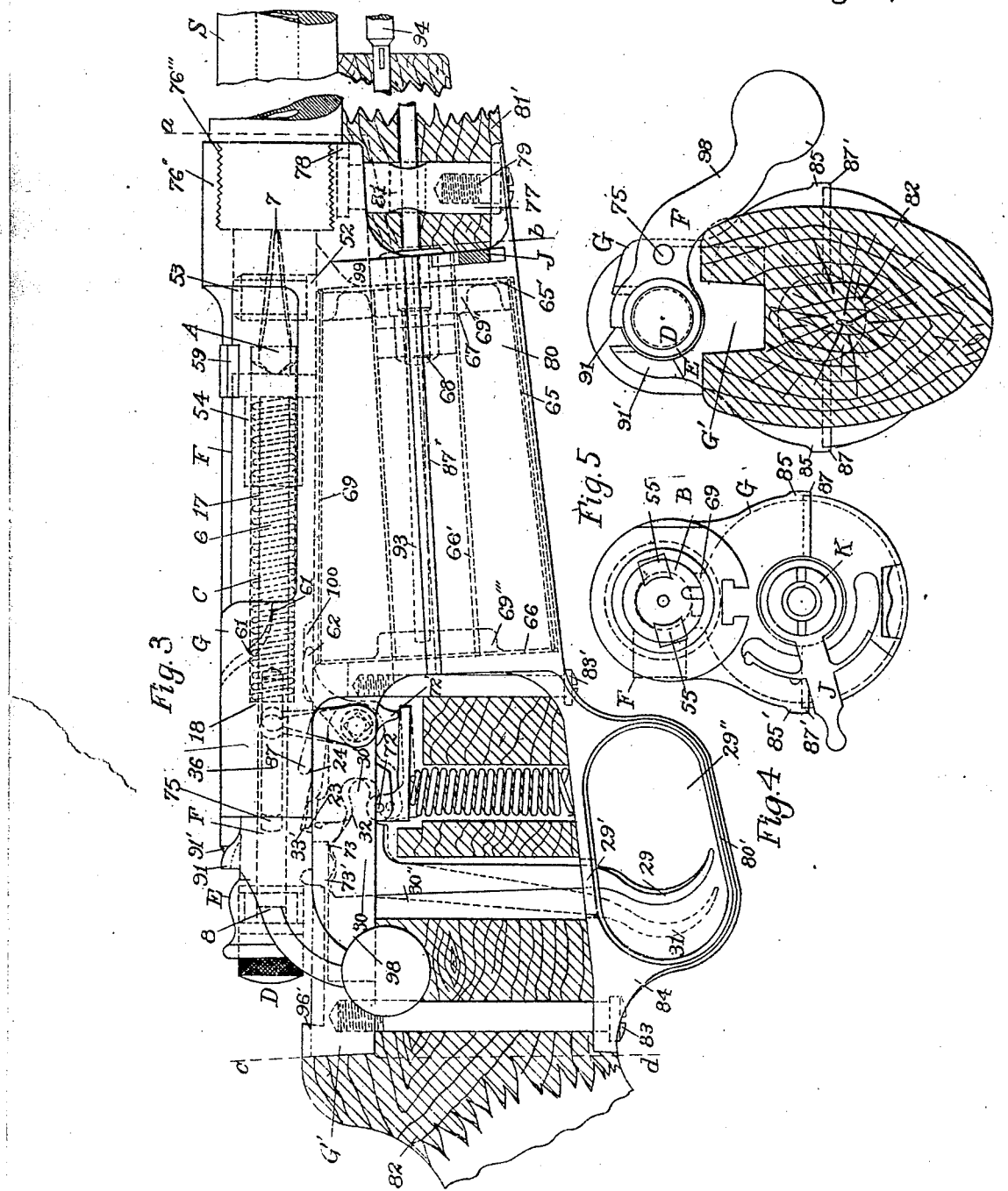
Witnesses
F. A. Boland,
H. Mallner
Inventor:
M. H. Durst,
By his Attorney,
J. H. Richards (No Model.) 12 Sheets—Sheet 3.

M. H. DURST.
MAGAZINE GUN.

No. 502,812. Patented Aug. 8, 1893.

Witnesses:
F. A. Boland.
H. Mallner.

Inventor:
M. H. Durst,
By his Attorney,
F. H. Richards

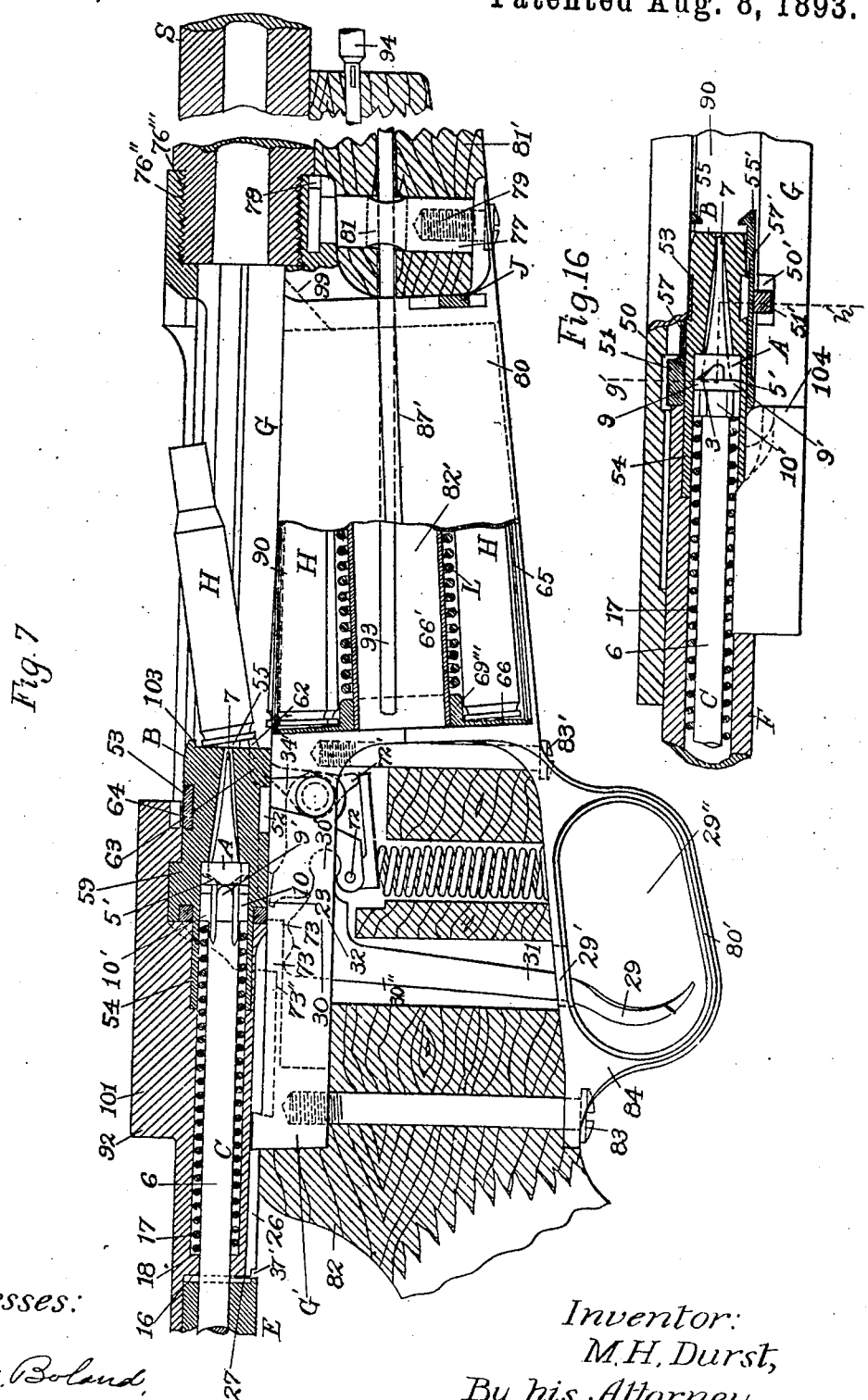

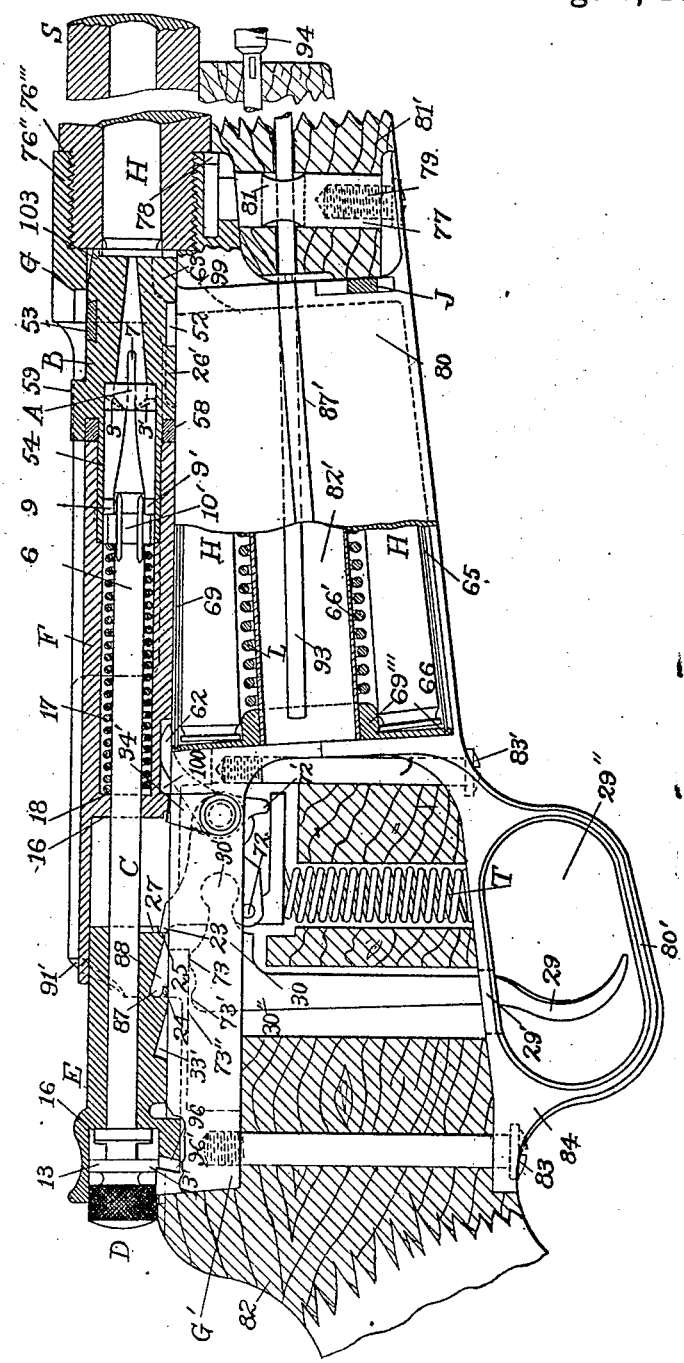

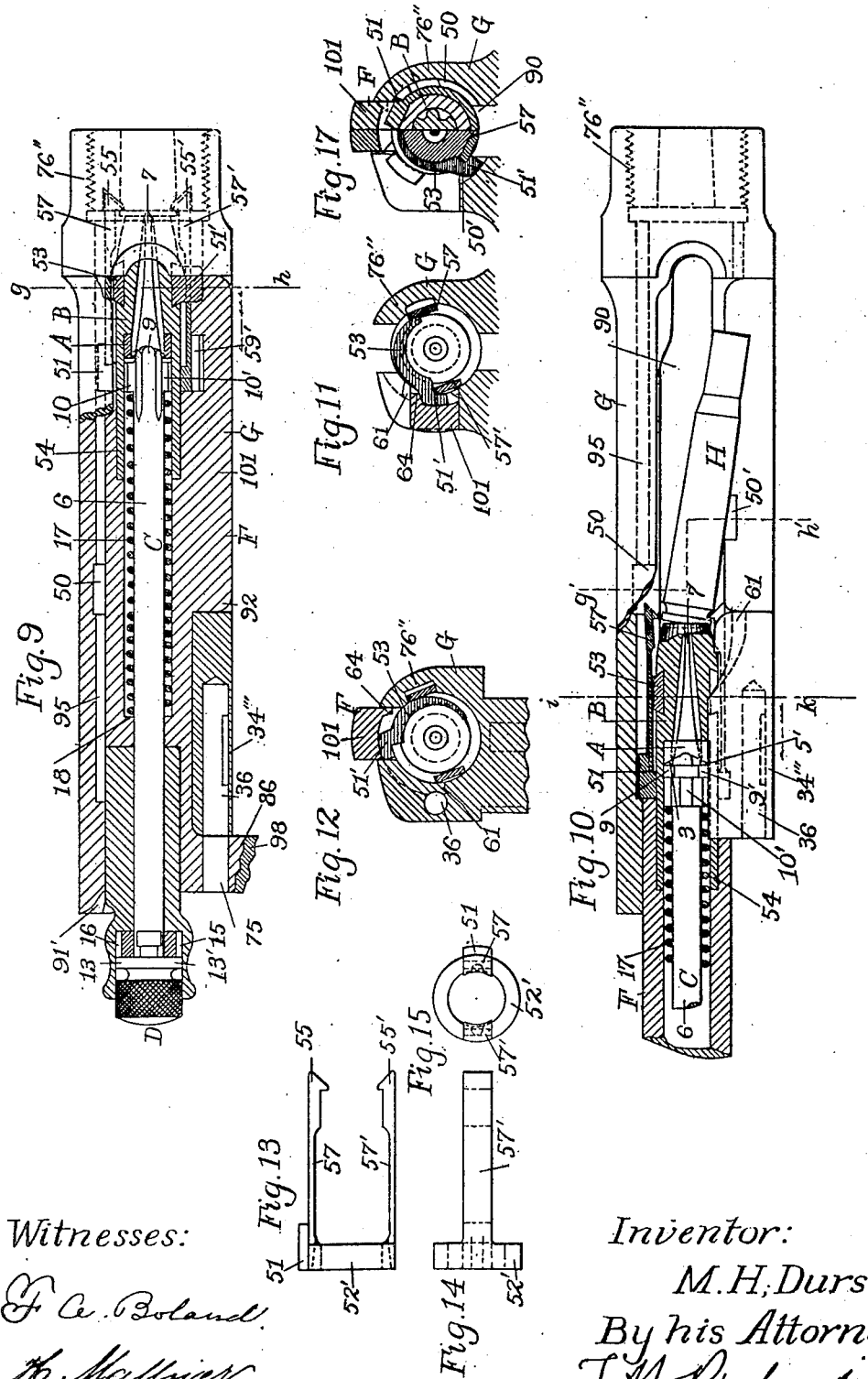

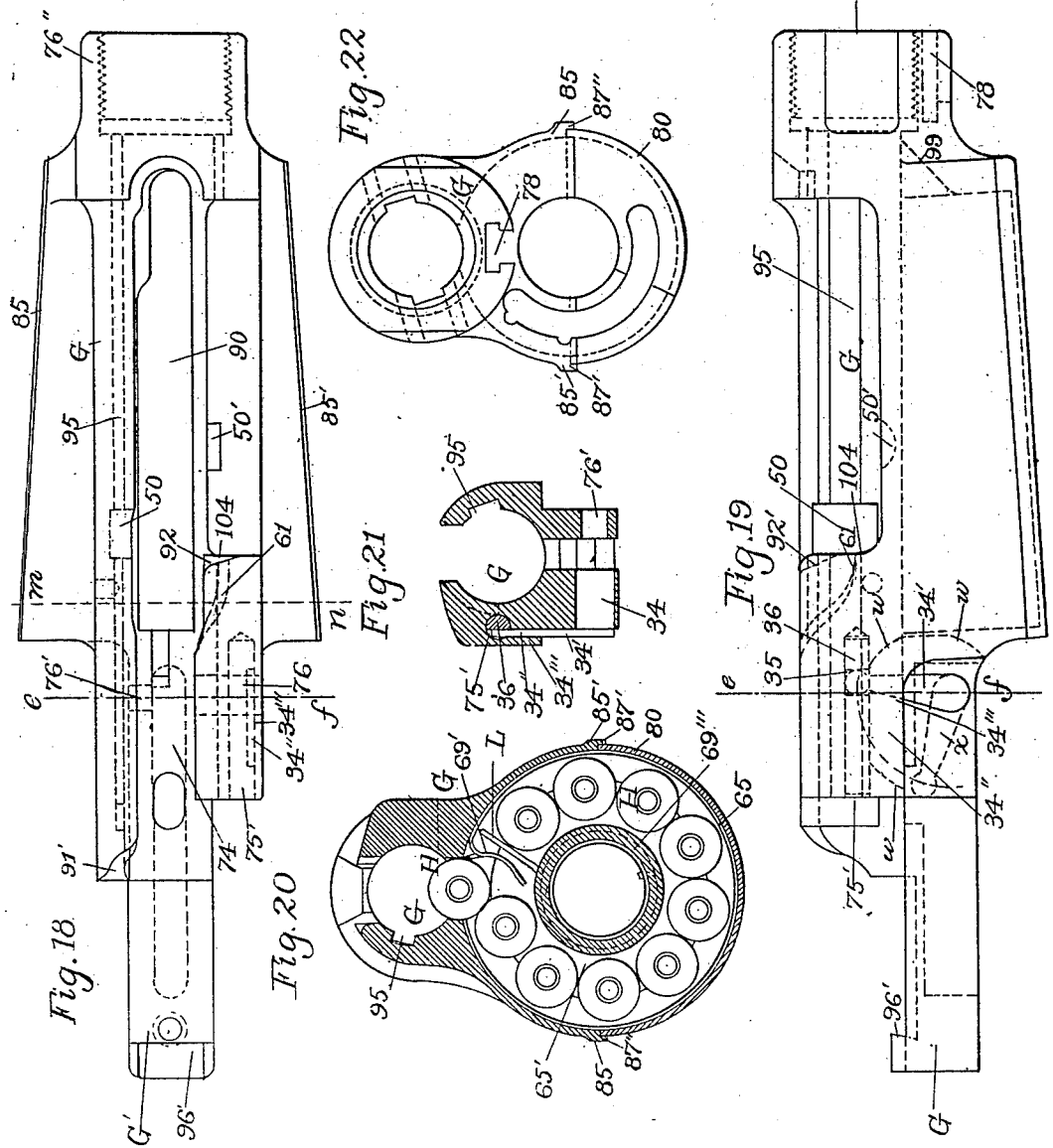
(No Model.) 12 Sheets—Sheet 7.
M. H. DURST.
MAGAZINE GUN.
No. 502,812. Patented Aug. 8, 1893.
Witnesses:
F. A. Boland
H. Mahner
Inventor:
M. H. Durst,
By his Attorney,
F. H. Richards (No Model.) 12 Sheets—Sheet 8.
M. H. DURST.
MAGAZINE GUN.
No. 502,812. Patented Aug. 8, 1893.
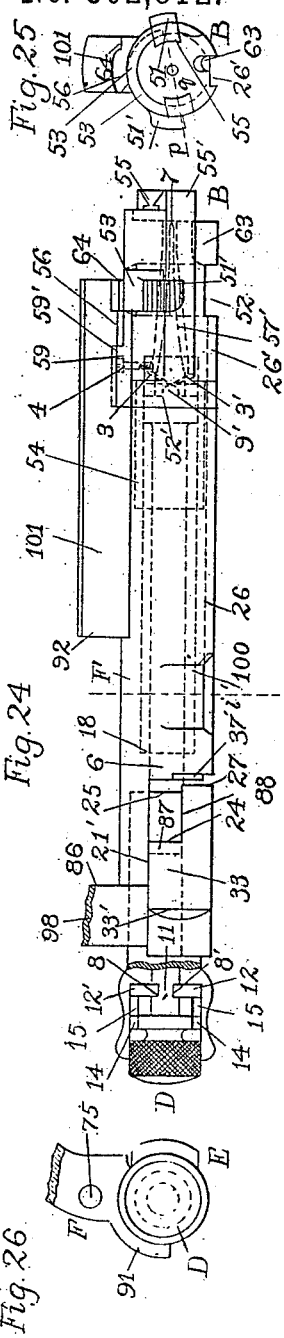
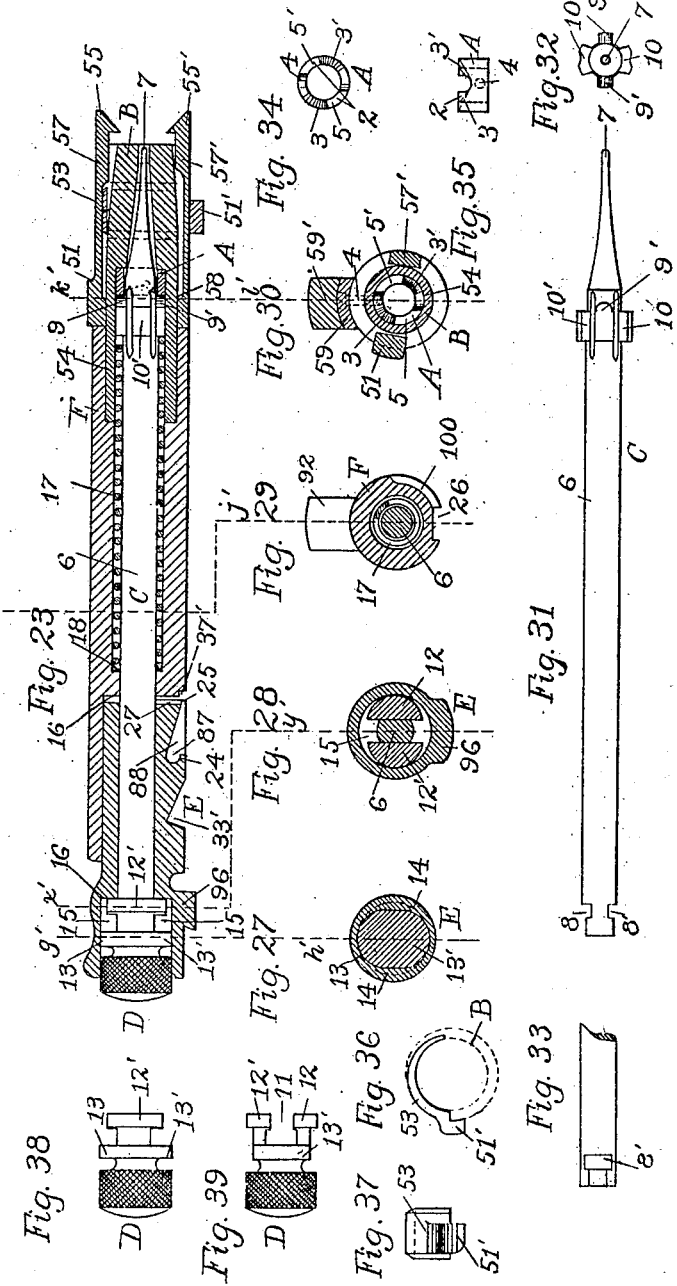
Witnesses:
F. W. Boland
H. Mallner
Inventor:
M. H. Durst
By his Attorney
F. H. Richards (No Model.)
M. H. DURST.
MAGAZINE GUN.
No. 502,812.  Patented Aug. 8, 1893.
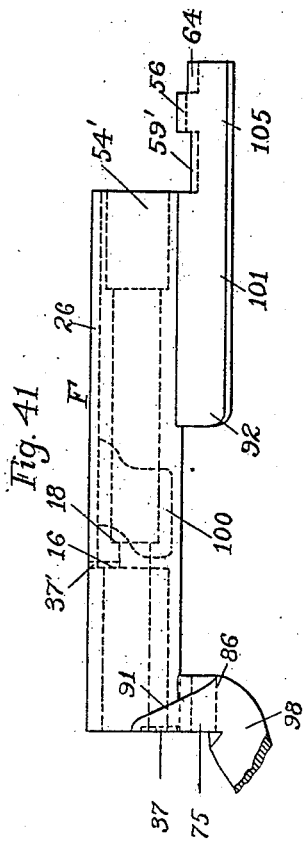
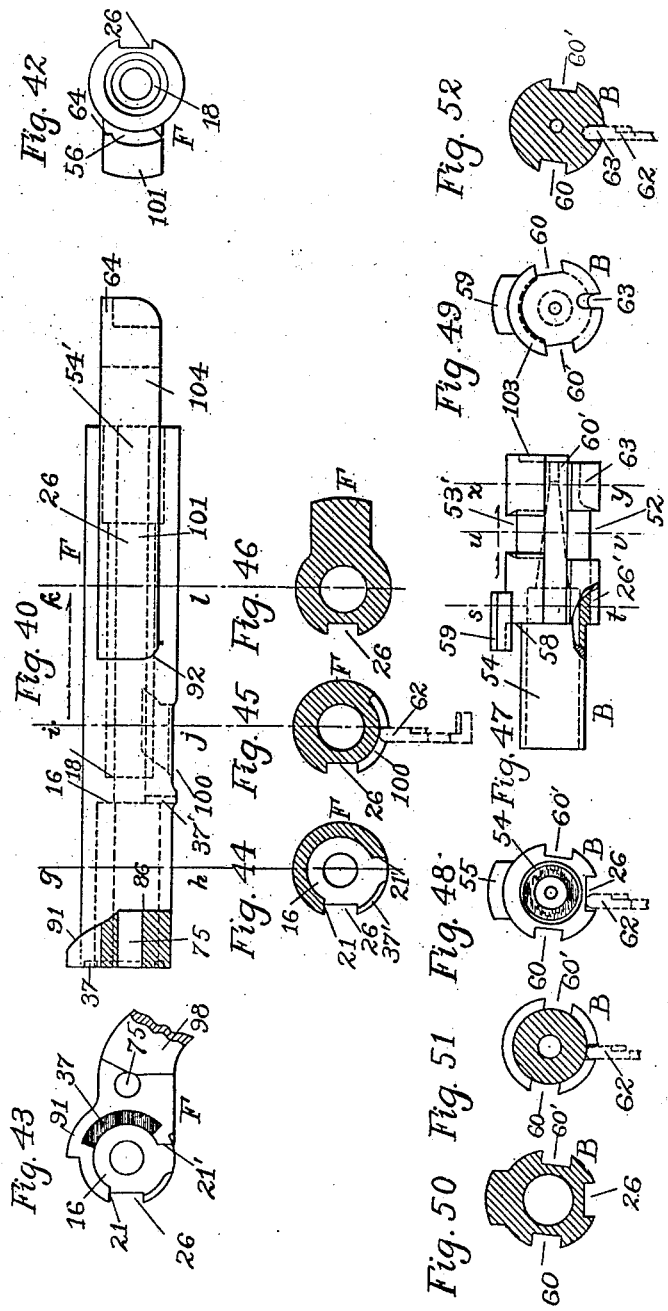
Witnesses
F. A. Boland
H. Mattner
Inventor:
M. H. Durst,
By his Attorney,
F. H. Richards

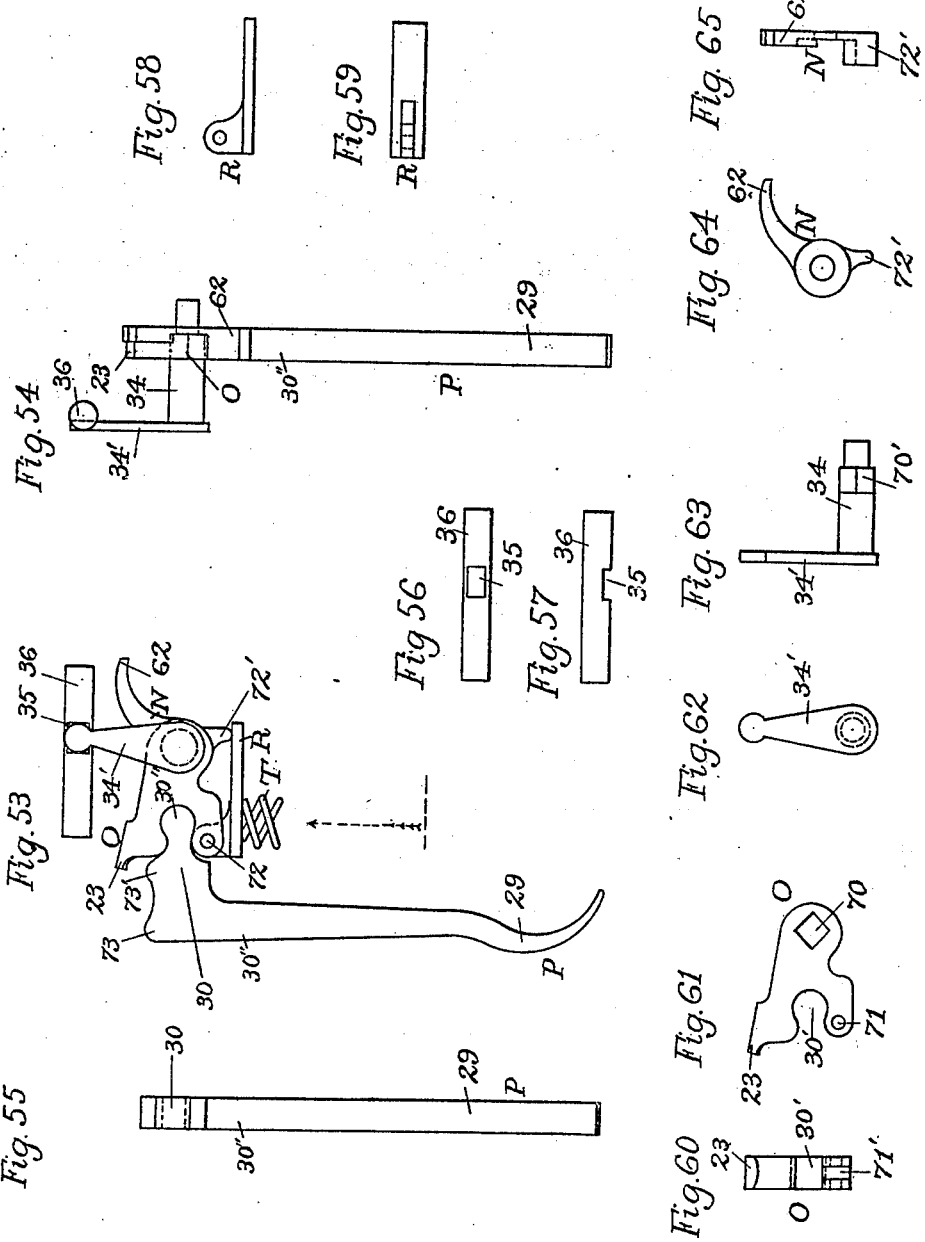

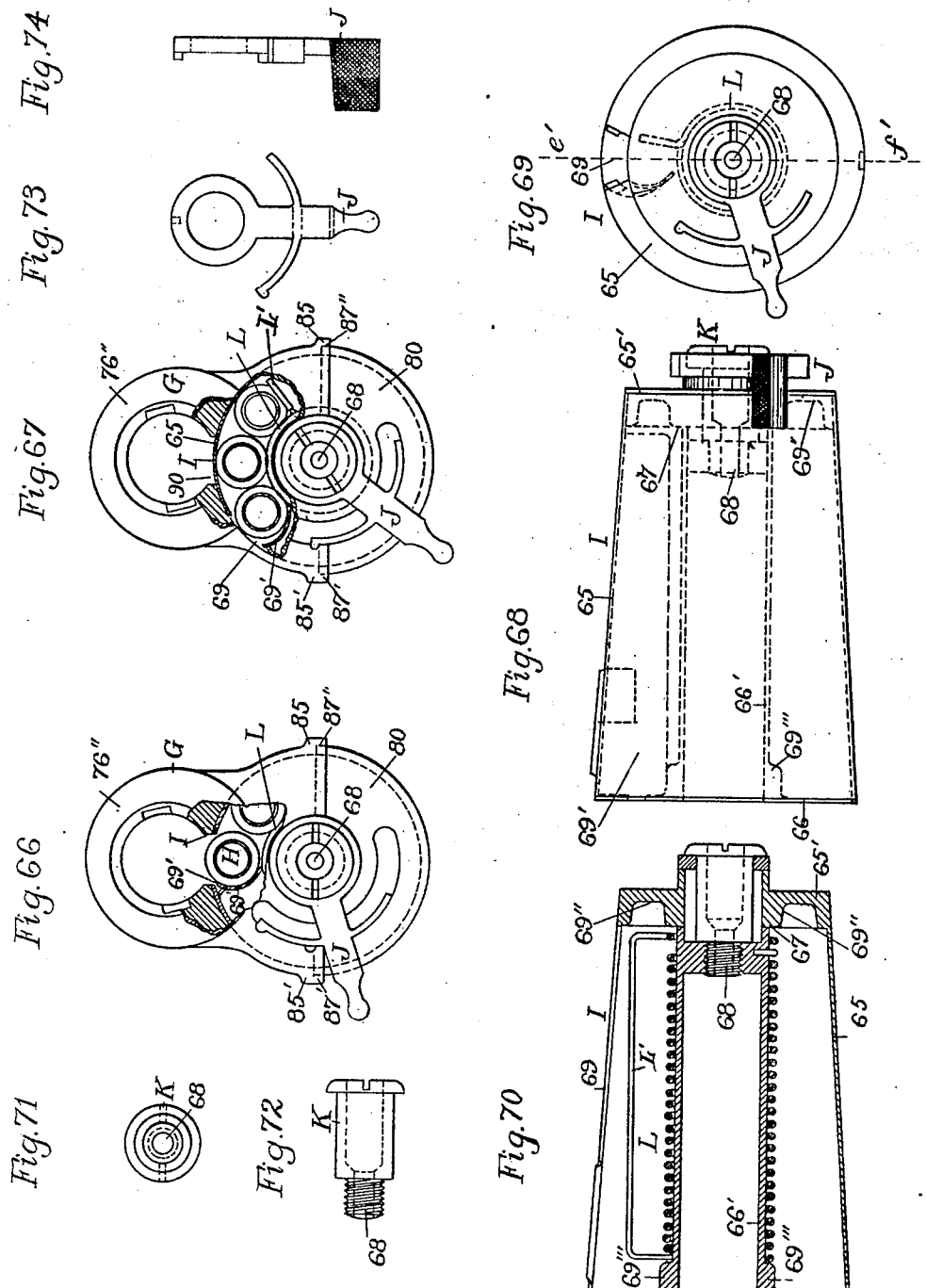

(No Model.) 12 Sheets—Sheet 12.
M. H. DURST.
MAGAZINE GUN.
No. 502,812. Patented Aug. 8, 1893.
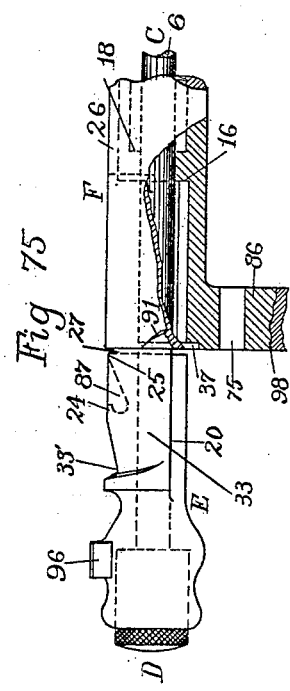
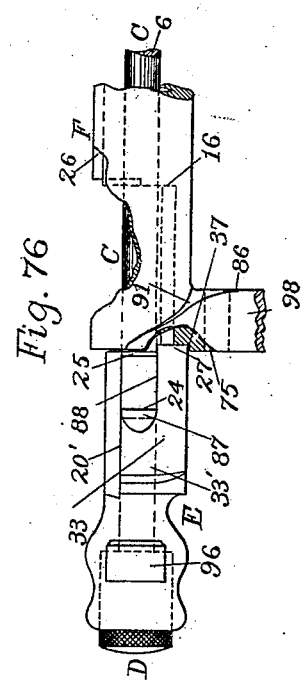
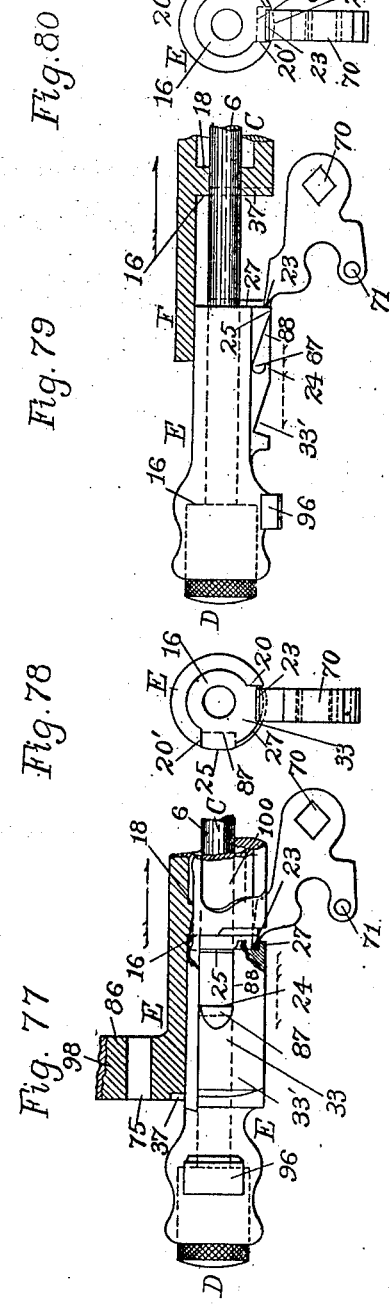
Witnesses:
F. A. Boland.
H. Mallner.
Inventor:
M. H. Durst,
By his Attorney,
F. H. Richards

UNITED STATES PATENT OFFICE.

MURRAY H. DURST, OF WHEATLAND, CALIFORNIA.

MAGAZINE-GUN.

SPECIFICATION forming part of Letters Patent No. 502,812, dated August 8, 1893.

Application filed December 12, 1892. Serial No. 454,927. (No model.)

*To all whom it may concern:*

Be it known that I, MURRAY H. DURST, a citizen of the United States, residing at Wheatland, in the county of Yuba and State of California, have invented certain new and useful Improvements in Magazine-Guns, of which the following is a specification.

This invention relates to magazine bolt-guns, the object being to provide a gun of that class having improved bolt-mechanism provided with effective cartridge-extracting, bolt-locking and safety devices; and provided also with an improved magazine of relatively large capacity and of compact form.

In the drawings accompanying and forming a part of this specification, Figure 1 is a plan view of the mechanism of a breech-loading magazine-gun embodying my present improvements. Fig. 2 is an elevation of the right-hand side of the mechanism, as seen from below in Fig. 1. Fig. 3 is a sectional side elevation (otherwise similar to Fig. 2) illustrating the manner of assembling the details of the mechanism. Fig. 4 is an elevation of the front end of the mechanism on the line $a\,b$ of Fig. 3, the barrel and fore-stock being removed. Fig. 5 is a rear elevation of the mechanism, the stock being shown in section on the line $c\,d$, Fig. 3. Fig. 6 is a side sectional elevation showing the bolt opened ready to be drawn back. Fig. 7 is a view similar to Fig. 6, but showing the bolt-mechanism retracted to its extreme rearward position; this view illustrates also the manner of ejecting the empty shell of the cartridge, and of engaging a cartridge from the magazine as the bolt is moved forward. Fig. 8 is a sectional elevation similar to Figs. 6 and 7, showing the bolt thrown forward, turned over to the right-hand, and locked; this position completes the cycle of operations ready for firing the gun; the position after firing is shown in Figs. 1, 2, 3 and 5. Fig. 9 is a sectional plan view of the bolt-mechanism in its locked position, showing the firing-pin thrown forward, and illustrating the construction and arrangement of certain details in this position. Fig. 10 is a view similar to Fig. 9, showing the bolt retracted to its extreme rearward position; and also showing certain of the details in different positions. Fig. 11 is a sectional view in line $g\,h$ of Fig. 9, looking rearward, and illustrative of the construction and operation of the extractor locking-and-actuating device. Fig. 12 is a view similar to Fig. 11, in line $i\,k$ of Fig. 10, further illustrative of the operation of the extractor locking-and-actuating device. Fig. 13 is a plan view of the pair of oppositely-disposed extractors constructed together in a single part, being united by the extractor-carrying ring. Fig. 14 is a side view of the extractor-parts shown in Fig. 13; and Fig. 15 is an end view of said parts drawn in projection with Fig. 14. Fig. 16 Sheet 4 is a sectional plan view of the bolt-mechanism in its unlocked position and drawn rearward sufficiently to permit the turning of the bolt-head for disassembling the bolt-mechanism. Fig. 17 is a vertical double-section on the line $g'\,h'$ of Fig. 16, looking rearward, showing the position of the extractors and extractor locking-and-actuating device with respect to their corresponding turning-grooves or notches. Fig. 18 is a plan view of the receiver, or main frame, of the breech-mechanism. Fig. 19 is a right-hand side elevation of the receiver, as seen from below in Fig. 18. Fig. 20 is a vertical transverse section, in line $m\,n$ of Fig. 18, showing the parts at the right hand of said line as seen from a point at the left-hand thereof, and showing also the magazine and magazine-cover in place, together with a number of cartridges in the magazine. Fig. 21 is a cross-sectional view of the receiver, in line $e\,f$ of Fig. 18, showing the part at the left-hand of said line as seen from a point at the right-hand thereof. Fig. 22 is an elevation of the forward end of the receiver, showing the magazine-cover in place, similarly as in Fig. 4. Fig. 23 is a sectional plan view of the bolt-mechanism when this is in the unlocked position, ready to be retracted. Fig. 24 is a side elevation of the bolt-mechanism with the parts in the positions shown in Fig. 23. Fig. 25 is an elevation of the forward end of the bolt-mechanism, drawn in projection with Fig. 24. Fig. 26 is an end elevation of the firing-pin head, drawn in projection with said part as shown in Fig. 24. Fig. 27 is a vertical section of the bolt-mechanism on the line $g'\,h'$ of Fig. 23, illustrating the locking action of the firing-pin coupling with the firing-pin. Fig. 28 is a section of the bolt-mechanism on the line $x'\,y'$ of Fig. 23, showing the manner of holding the firing-pin coupling on the firing-pin. Fig. 29 is a section of the bolt-mechanism on line $i'$ $j'$ of Figs. 23 and 24; this view shows the assembled bolt, spring, firing-pin, and ejector-slot. Fig. 30 is a section of the bolt-mechanism on line $k'$ $l'$ of Fig. 23, illustrating the assembled bolt, retracting-cam, bolt-head, and other details. The positions of the details shown in Figs. 27, 28, 29 and 30 correspond to their positions, respectively, in Figs. 6, 7, 9 and 23. Fig. 31 is a plan view of the firing-pin. Fig. 32 is an end view of the firing-pin from the forward end thereof. Fig. 33 is a side view of the rearward end of the firing-pin, corresponding to the position of said end in Fig. 23. Fig. 34 is an end view of the retracting-cam contained within the bolt-head. Fig. 35 is a plan view of the retracting-cam. Fig. 36 is an end view of the extractor-lock, which is used to lock over the extractor and thereby hold the cartridge fast while the bolt is in its forward position, and to release the cartridge before the bolt reaches its rearward position. These operations are illustrated in Figs. 9, 10, 11 and 12. Fig. 37 is a front side-view of the extractor-lock, drawn in projection with Fig. 36. Fig. 38 is a plan view of the firing-pin coupling, showing this in the same position as in Fig. 23. Fig. 39 is a side view of said coupling, drawn in projection with Fig. 38. Fig. 40 is a side view of the main-bolt, shown as when in its locked position in the gun, (see Fig. 2,) the lever of the bolt being shown broken away. Fig. 41 is a plan view of the bolt, drawn in projection with Fig. 40, and showing (by dotted lines) the interior construction thereof. Fig. 42 is an end view of the bolt, as seen from the right-hand in Fig. 40. Fig. 43 is an end view of the bolt, as seen from the left-hand of Fig. 40, showing the safety-bolt hole, and the handle broken away. Fig. 44 is a transverse section of the bolt on line $g$ $h$, Fig. 40, and shows the bore for the firing-pin, the side-opening for the firing-pin head, and the ejector-groove. Fig. 45 is a transverse section on line $i$ $j$, Fig. 40, and illustrates the relative position of the ejector and ejector-groove, when locked in the gun, to the other parts of the bolt; also the coil-spring recess in the center; in Fig. 29 is a similar section of the bolt in its unlocked position. Fig. 46 is a transverse section of the bolt in its locked position, this view being taken on the line $k$ $l$, Fig. 40; these three sections, Figs. 44, 45 and 46, in connection with Figs. 40, 41, 42 and 43, illustrate in detail the construction of a main-bolt. Fig. 47 is a side view of the bolt-head, illustrating the several details of construction, which will be hereinafter more fully described. Fig. 48 is an end view of the bolt-head as seen from the left-hand of Fig. 47, showing the firing-pin opening, extractor-grooves, and the relation of the ejector to the bolt-head. Fig. 49 is an elevation of the front end of the bolt-head, as seen from the right of Fig. 47, (corresponding to Fig. 25 with the extractor and main-bolt removed.) Figs. 50, 51 and 52 are, respectively, transverse sections on lines $s$ $t$, $u$ $v$, and $x$ $y$, looking toward the right-hand in Fig. 47, and, taken together with Fig. 47, show in detail the construction of the bolt-head. Figs. 51 and 52 also show positions of the ejector relatively to the bolt. Fig. 53 is a side view of the assembled sear-mechanism, illustrating the method of connecting the various parts thereof. Fig. 54 is a front end-view of the sear-mechanism, as seen from the right-hand in Fig. 53. Fig. 55 is a front edge-view of the trigger, of which the side view is shown in Fig. 53. Fig. 56 is a side view of the safety-bolt pin. Fig. 57 is a plan view of the safety-bolt. Fig. 58 is a side view of the bearing-plate for operating the sear and the ejector in combination with a spring, as shown in Figs. 3, 6, 7 and 8. Fig. 59 is a plan view in projection with, and corresponding to, Fig. 58. Figs. 60 and 61 are, respectively, front-end and side views of the sear. Figs. 62 and 63 are, respectively, side and end views of the safety-bolt-actuating lever and the sear-shaft, showing part of the shaft squared to receive the sear. Figs. 64 and 65 are, respectively, side and end views of the cartridge-ejector, this being shown fitted to be assembled with the sear-mechanism, as in Fig. 54, so that it will be flush with the trigger, and thereby be in alignment with the trigger and sear, to receive the pressure of the spring through the spring-plate. Fig. 66 is a front end-view of the cartridge-magazine assembled in the case, or frame, having a small portion broken away to show the cartridges in place; also to show the position which they take while the magazine is in use. The lock-out device shown at the left-hand of Fig. 66 is for holding the magazine in position so that any jars, shocks, or the firing of the gun, shall not displace the magazine and thereby interfere with the feeding of the cartridges to the barrel. Fig. 67 is a corresponding and similar view to Fig. 66, with the exception that the magazine is shown closed or "cut-out," with the lock-out at the opposite end of the slot for the purpose of retaining it in its idle, or reserve, position; the magazine thus acting as a supply or storage magazine, the gun being now used as a single-loader. Fig. 68 is a side view of the cartridge-magazine by itself, showing its shifting-device at the right-hand, and showing, at the top, the edge of the lip which is used to hold the cartridge in the uppermost position; the assembling of the magazine is fully shown in Figs. 3, 6, 7, 8 and 20. Fig. 69 is an end view of the magazine, as seen from the right-hand in Fig. 68. Fig. 70 is a longitudinal section on the line $e'$ $f'$, Fig. 69, showing the preferred construction and arrangement of the details. Figs. 71 and 72 are, respectively, a side view and an end view of the connecting, or "assembling" screw, shown in place in Figs. 68 and 69. Figs. 73 and 74 are, respectively, side and end views of the magazine-shifting, or "lock-out," lever, shown in place on the magazine in Figs. 68 and 69. Fig. 75 is a plan view of a portion of the bolt-mechanism, the main-bolt being broken away to show the firing-pin, and to show the recess in the rearward end of the bolt, in which recess engages the catch of the firing-pin head. This view is illustrative of the operation of locking the firing-pin in the rearward end of the bolt by withdrawing it beyond the end of said bolt, and giving it a quarter-turn upward; this position is shown as a mean between the two ends of the quarter-revolution, the flange or catch of said head resting on the back end-face of the bolt before it enters the recess. Fig. 76 is a view corresponding to, and in projection with, Fig. 75, except that the firing-pin head is here shown turned completely around to its locked position; in this position it is impossible to move the firing-pin or firing-pin head in any direction whatsoever, without first drawing the catch backward out of the recess and turning the head around into its former position as shown in Figs. 77 and 79. Fig. 77 is a side elevation partially in section and corresponding to Fig. 24, showing the bolt traveling forward in the direction of the solid-line arrow and engaging the sear-catch above the flange of the firing-pin head, the bolt being locked from firing until turned as shown in Figs. 79 and 80. Fig. 79 is a view similar to Fig. 77, except that the bolt has traveled forward to the closed position ready for firing, leaving the sear free to act. Figs. 78 and 80 are end views (corresponding, respectively, to Figs. 77 and 79) of the firing-pin head and sear, as seen from the right-hand of Fig. 79.

Similar characters designate like parts in all the figures.

My improved magazine-gun comprises a frame, G, more generally designated as the "receiver," which is adapted for carrying the magazine and the operative details of the magazine; the usual gun-barrel, and a stock and fore-stock. The receiver is constructed and adapted for carrying a longitudinally-reciprocating bolt-mechanism, which according to my present improvement has a non-rotatory bolt-head, B, and a rotary-reciprocating main-bolt, designated in a general way by F. The forward end, 76″, of the receiver is bored and threaded for receiving the correspondingly-threaded rearward end, 76‴ of the gun-barrel S, which is (or may be) chambered in the usual manner for receiving the cartridges, H, these being herein shown of the so-called "rimless" variety. Immediately underneath the path of the bolt-mechanism, the receiver has therein an opening or passage-way, 90, Figs. 7, 10, 17 and 18, through which (when loading the magazine) the cartridges are forced downward into the magazine, and through which said cartridges are, one at a time, afterward forced upward from the magazine into position for being carried forward by the bolt. The receiver is also constructed with a cam, 91′, for engaging the corresponding cam, 91, of the bolt F for the purpose of withdrawing the bolt-mechanism to start the cartridge-shell; by means of the two oppositely-placed cams 91′ and 91 the bolt is quickly and rapidly forced back until the side 101 is stopped by the receiver. The cam 92′ may be like (or similar to) the cam 91′, and is for engaging the cam 92 during the locking operation, for producing a forward motion of the bolt to drive the cartridge fully home, ready for firing the same.

The main-bolt carries (following the system usually adopted in bolt-guns) the longitudinally-reciprocating firing-pin and its spring, together with a firing-pin head removably fixed to the firing-pin and constructed for co-acting with the sear of the gun mechanism, which sear is connected with a trigger for operating the same, and is normally held in engagement with the firing-pin head by means of a spring that in the present instance also actuates the ejector.

The cartridges are carried in a rotatory magazine which is designated in a general way by I, and is located immediately under the path of the bolt-mechanism; and which is contained in a magazine-chamber formed between the receiver and its under-cover. Means are provided for shifting the magazine by a turning thereof to carry the discharge-opening thereof out of alignment with the corresponding passage-way of the receiver, for holding the magazine-supply of cartridges in reserve. Also, the magazine is centrally perforated to furnish a space into which the end of the cleaning-rod may project, whereby a cleaning-rod longer than the gun-barrel may be carried in the fore-stock of the gun.

The receiver, G, consists of an open frame constructed for carrying the gun-barrel, the bolt-mechanism, the sear-mechanism, and for attachment to the stock of the gun; it is shown held to the fore-stock by means of a stud, 77, whose flanged upper end engages in the corresponding slot or recess 78 formed in the under side of the receiver. The lower end of the stud 77 is furnished with a binding-screw, 79, holding in place the forward end of the magazine-cover 80, and binding between said cover-end and the receiver the rearward end of the fore-stock 81′. The stud 77 has therein a transverse hole, 81, longitudinally of the gun, through which the cleaning-rod 94 extends into the interior space 82′ of the magazine I. The magazine assembling-screw K also has a central opening, 68, for the passage of said cleaning-rod. By this means sufficient space is provided longitudinally of the gun for the reception of a cleaning-rod of sufficient length to reach entirely through the gun-barrel. The rearward end G′ of the receiver is shown held to the forward end of the stock 82 by the screw 83, which also holds the rearward end of the trigger-guard 84; at the forward end of the trigger-guard another screw, 83′, reaches through the trigger-guard and the stock into the receiver, for further strengthening and attachment of the several parts. The trigger-guard 80' and the magazine-cover 80 are herein shown constructed of a single piece, the edges of the magazine covering the portion of said part joining the under edges of the magazine-covering-rings, 85 and 85', of the receiver, by means of the lips 87' and 87'', (Figs. 20 and 22,) for making a close joint. By means of the construction here described, a chamber circular in cross-section, and which may be of the general form of a cone as herein shown, is provided for the reception of a magazine I.

The main-bolt F, usually designated simply as the "bolt" of the gun, is shown provided with the side-wing 101, constructed for engaging forward of the receiver-abutment 104 for receiving the backward thrust of the bolt due to the firing of the cartridge. The bolt F being rotary-reciprocating as herein before mentioned, by means of said movement the projecting wing or rib 101 is carried from the locked position shown in Fig. 3 to the unlocked position shown in Fig. 6 and vice versa. The forward end of the bolt F is bored to receive the stem of the non-rotating bolt-head, which head is designated in a general way by B. The side-wing 105 extends forwardly from the cylindrical portion of the bolt F for carrying the hook 56 for engaging with the bolt-head B to hold this in position longitudinally of the bolt-mechanism; also to carry the extractor-lock actuator 64, whose function is hereinafter described in connection with the bolt-head B and its accessory devices. At its rearward end the bolt F is furnished with the usual handle-arm 98, whereby rotary and longitudinal movements may be imparted to the main bolt, this being fitted to have turning and sliding movements in the receiver, after the well-known manner of operating the general class of bolt-guns in which the main-bolt (or a portion thereof) has similar successive movements. Other minor details of the main-bolt are hereinafter described in connection with parts to which the same relate.

The "severable" bolt-head B has a stem, 54, fitted to turn in the bore 54' in the bolt F, and has a side-lug, 59, adapted to engage in the space 59' behind the hook 56 of said bolt. The head B is centrally bored for the passage through it of the firing-pin C; in the opposite sides thereof has the grooves 60 and 60' for the extractors 57 and 57', respectively; in the lower side has the ejector-groove 63, and at its front end is constructed with a top-flange, 103, for holding down the head of the cartridge, as illustrated in Figs. 7 and 8.

The bolt-head B has, about midway of its larger diameter, a circumferential guide-way, which, in the preferred form of the mechanism, is under-cut on the upper side of the bolt-head and between the extractors, for engaging and holding in place the bevel-sided extractor-lock-and-actuator; on the under side, said guide-way is widened as at 52, Fig. 24. When the extractor-ring 52', with its extractors, is withdrawn from the bolt-head, the lock-and-actuator 53 may be slid around in the guide-way and removed through said widened portion thereof. When the parts are disassembled and it is required to re-assemble them, the operator first places said extractor-lock 53 in the widened portion 52 of said circumferential guide-way, and slides it over to the upper side of the bolt-head into its idle or mid-stroke position, shown in Fig. 24; and then slides the extractor-carrying ring 52' over the stem 54 of the bolt-head, the hooks, 55 and 55', of said extractors respectively, snapping over and in front of the bolt-head in the position ready for use. The bolt-head and its accessory parts having been thus assembled, these may then be assembled with the bolt by sliding the stem 54 of the bolt-head into the bore 54' in the front end of the bolt, (see Figs. 41 and 47,) and then turning the bolt-head to bring the projection 59 thereof into the corresponding notch 59' behind the hook 56 of the bolt; thereby firmly engaging the two parts of the bolt-mechanism together, so far as relates to the longitudinal movement of the bolt-mechanism in the gun.

The extractor, or the extractors when more than one is used, being carried on the extractor-carrying ring 52' and this ring being freely removable from the stem 54 of the bolt-head when the bolt and said head are disengaged, furnishes a ready means for assembling and disassembling the bolt-mechanism without the use of tools; and also serves for holding the extractor in place by means of the engagement of the bolt and bolt-head with each other.

Two oppositely-disposed extractors, 57 and 57' (shown in detail in Figs. 13, 14 and 15) have at their forward ends the usual cartridge-engaging hooks, 55 and 55', respectively, and at their rearward ends are shown joined to the extractor ring 52', which ring fits upon the stem 54 of the bolt-head B, next to the shoulder 58 of said head and underneath the rearwardly-extending projection 59 of the bolt-head. The extractors 57 and 57' lie in the opposite grooves, 60 and 60', respectively, of the bolt-head, and about midway of the length thereof extend over the extractor-wedge 53, which lies in the groove 53' formed in the bolt-head and has a movement therein the extent of which is indicated by the two positions thereof shown in Figs. 11, 12 and 59. Said extractor-wedge 53 is also designated as the extractor-lock, since at one end thereof it has a catch, 51', which in the position shown in Fig. 11 engages over the extractor 57' for holding the same closed while the bolt is in its forward position. When the bolt is retracted, the projecting catch 51' is brought against the extractor-actuating cam 61 of the frame, and during the latter part of the retractive movement of the bolt is thrown from the position shown in Fig. 11 to the position shown in Fig. 12, thereby releasing the extractor 57′, and by means of the wedge 53 throwing out the opposite extractor 57, disengaging the same from the cartridge-head, as shown in Fig. 10. At the end of said retractive movement of the bolt, the ejector 62 is elevated by its actuating-spring to the position shown in Fig. 7, within the under slot 63 at the forward end of the bolt-head, and strikes the head of the cartridge, as indicated in Figs. 7 and 10, throwing the same from the gun by a quick blow, the cartridge being at this time held only by the extractor 57′, by reason of the other extractor 57 having been thrown out as hereinbefore stated. On the forward movement of the bolt, the extractors remain in the same position relative thereto as is shown in Figs. 10 and 11 until the sliding movement of the bolt has been completed, when (on the turning of the bolt) the lip 64 of the bolt engages upon the projection 51′ of the extractor-wedge and turns this over from the position shown in Fig. 12 to that shown in Fig. 11, thereby letting the cartridge H into engagement with the cartridge-extractor, and by means of the catch 51′ locking the opposite extractor closed, as indicated in Fig. 11.

By means of the mechanism here described, two similar extractors are provided for simultaneously engaging the cartridge for extracting the same from the bore of the gun-barrel; one of the extractors is disengaged from the head of the cartridge-shell previous to ejecting the same; the other extractor remains in engagement with the shell during the ejection thereof; and the throwing out, releasing, locking and unlocking of the extractors are automatically accomplished by means of the ordinary movements of the bolt.

In my improved breech-loading fire-arm, the opening rotary unlocking movement of the bolt is divided into two substantially equal portions, the first of which does not retract the bolt. On the locking movement of the bolt, the first said part of the rotary movement (by means of the engagement of the inclines 91 and 92 with the corresponding inclines 91′ and 92′ of the receiver) forces the bolt forward to drive the cartridge firmly into the chamber of the barrel; but this movement does not actuate the extractor cam-and-lock. On the further rotary locking movement of the bolt, said cam-and-lock is actuated by the forward end 64 of the bolt to release the extractor 57 and allow the hook 55 thereof to engage the cartridge-head, and to lock the extractor 57′ firmly into engagement with said cartridge-head.

On the rotary unlocking movement of the bolt, the first portion of the rotary movement does not retract the bolt, but carries the incline, or cam-face, 91, thereof against the aforesaid corresponding cam-face, or incline, 91′, of the receiver, so that on the further rotary unlocking movement of the bolt this is forcibly drawn back, thereby so far withdrawing, or "starting" the cartridge from the barrel as to free the same from the bore ready for final extraction by a direct pull on the handle 98 of the bolt-mechanism.

As a means for preventing the firing of the gun when the bolt is turned into its unlocked position, the firing-pin C is operatively connected with the bolt to have corresponding rotary movements, and the bolt-head B is provided with a retracting-cam constructed and operating to retract the firing-pin on the turning of the bolt to unlock the same.

The retracting-cam is shown in the form of a collar or annular ring, A, inserted in the bolt-head B, as shown best in Figs. 23, 30, 34 and 35. The rearward end of said ring is shown cut away to form the cam-faces 3 and 3′, and the entire piece is rigidly fixed in place in the bolt-head by some suitable means, as, for instance, by a pin, 4, or by a screw (not shown); also, said cam may be integral with the bolt-head itself, and the separate cam-ring A be thus omitted. Between the cam-faces 3 and 3′ are shown the stop-faces 5 and 5′, which are for positively limiting the forward movement of the firing-pin at the proper point.

The firing-pin C consists of the rod 6 having the usual firing-point 7 for striking the cap of the cartridge. The firing-pin is shown constructed, on its rearward end, with the parallel transverse notches 8 and 8′ (Figs. 31 and 33) for sliding the pin as required for retracting the same in disassembling, said notches engaging with a correspondingly-shaped part hereinafter described. At a point near its forward end (corresponding to the position of the aforesaid retracting-cam) the firing-pin is provided with the cam-bearings 9 and 9′ for engaging the aforesaid cam-faces 3 and 3′ to retract the firing-pin from the position shown in Fig. 9 to that shown in Figs. 21 and 22. The rotary movement of the firing-pin for effecting its retraction as aforesaid is obtained by the turning of the bolt from the position shown in Figs. 1 to 5, inclusive, to the position shown in Figs. 6 and 7, the firing-pin being connected to revolve with the bolt, as elsewhere herein more fully set forth.

On the throwing forward of the bolt-mechanism in the locking of the same in position for firing the gun, the firing-pin is turned to bring the aforesaid cam-bearings 9 and 9′ in line with the forward, or deeper, portion of the cam-faces 3 and 3′, so that on the firing of the gun the firing-pin may go forward to the position shown in Fig. 9, its forward movement being limited by the striking of the stop-flanges 10 and 10′ against the stop-faces 5 and 5′ of said cam.

Previous to the turning of the bolt to lock the same, the cam-bearings 9 and 9′ of the firing-pin, standing as they do in line with the higher portions or stop-faces 5 and 5′ of the aforesaid retracting-cam, serve to positively prevent the throwing forward of the firing-pin to its operative position, should the sear by any means become unhooked from the firing-pin head. This device, therefore, of a retracting-cam combined with the cam-bearings of the firing-pin, constitutes an effective safety-device for preventing the premature firing of the gun, it being manifestly impossible for the firing-pin to go forward its full stroke until after the bolt has been turned from its unlocked to its locked position. This safety apparatus guards against the premature firing of a cartridge accidentally before it has been driven fully forward into the bore of the gun-barrel and the bolt locked.

While the firing-pin is herein shown provided with two cam-bearings, 9 and 9', and the retracting-cam with two corresponding cam-faces, of course the combination will be operative with only one of said cam-bearings and one of said cam-faces. In this case, of course, only a single stop-face, as 5 or 5', would exist on the cam, in place of the two herein shown. I prefer, however, to employ the duplex construction and arrangement of said features as illustrated in the drawings forming a part of this specification; so that in the event of the breakage of one cam-bearing, the other one would remain for use.

The bolt at its rearward end is bored and cut away on one side thereof to receive the firing-pin head E, which head is, through that part of its length which enters the bolt, of the general form of a cylinder having a segmental enlargement on one side and longitudinally thereof. The side surfaces, 20 and 20' of said segmental enlargement, Figs. 78 and 80, fit between the corresponding edges 21 and 21' of the bolt, Figs. 43, 75, 76, 77 and 79. By this means the firing-pin head is free to slide longitudinally of the bolt, and is rotated by the bolt when this is turned from its locked to its unlocked position, and vice versa. When the bolt is in its locked position, one side, 20', of the said segmental portion of the firing-pin head comes in line with the point or catch 23 of the sear, and has cut therein the safety or half-cock catch 24 and the full-cock catch 25. When the bolt is in its retracted position, the sear-slot 26 thereof comes to the lower side, so that when the bolt is driven forward, the point of the sear (this running in said slot) engages with the forward end of the firing-pin head above the flange 27 thereof, as indicated in Figs. 7 and 8. The sear catching the firing-pin head above the rim or projecting edge 27 of said head, this edge constitutes a safety-catch for preventing the premature pulling of the trigger. During the latter portion of the forward movement of the bolt, the firing-pin head is held back by the engagement of the sear with the face 25 thereof, as indicated in Fig. 8, (the premature discharge of the firing-pin being prevented by the aforesaid flange 27,) and when the bolt is at the forward end of its sliding stroke (as shown in Fig. 8) it is then turned to its locked position, turning with it the firing-pin head and bringing the full-cock catch 25 in engagement with the sear, as in Fig. 8, ready for the firing of the gun. The trigger 29 being now pulled back, the forward arm 30 thereof, engaging in the socket 30' of the sear, draws down the sear to the position indicated by dotted lines at 31 and 32, to disengage the catch 23 of the sear from said firing-pin head catch 25, thereby permitting the spring 17 to throw forward the firing-pin to strike the cartridge, as indicated in Fig. 9.

The rearward end of the firing-pin head is shown externally shaped to facilitate grasping the same for the purpose of retracting the firing-pin by hand, either for cocking the arm ready for firing or for bringing it to the half-cocked or cocked position. In the segmental portion of said head 33 is shown formed a recess, 33', for receiving the catch of the sear, so that the sear may, when the firing-pin head is in its forward position, assume the same position it has when engaging either of the catches 24 and 25 of said head. This construction and arrangement are for the purpose of permitting the sear, through its supporting shaft or pin 34 and the lever-arm 34' thereof, (this lever-arm engaging in the notch 35 of the safety-pin 36,) to throw forward said safety-pin 36 to its inoperative position, for permitting the locking and unlocking of the bolt.

In the rearward end of the bolt is shown formed a shallow recess, 37, corresponding in extent to the aforesaid safety-flange 27 of the firing-pin head. By drawing back the firing-pin slightly farther than its normal stroke, a little distance back of its full-cock position shown in Fig. 8, the head E (together with the firing-pin and its coupling) may be turned to the position shown in Fig. 76, with the segmental enlargement of said head resting against the rearward end of the bolt. When the parts are in this position, the bolt-mechanism may be operated as when using the gun, the loading, pulling the trigger, and extracting and ejecting, being all performed as when the gun is in actual use, without danger of firing the cartridges. By this means the arm is prepared for use in drilling, where it is desirable to have the soldier go through all of the manual movements without actually firing the cartridges. By this means live cartridges may be safely passed through the gun; and in using "dummy" cartridges the destructive action of the firing-pin on the same is prevented. Also, the operation of the firing-pin being suspended as set forth, it is not liable to be broken by the concussion due to its striking the stopfaces instead of the cartridge-caps; it being well understood that the "snapping" of the gun without using the cartridges is especially objectionable.

The firing-pin head E has therein the half-cock notch 87, constructed with the catch 24 for catching over the end of the sear to lock this against action; and has the side wall 88 for engaging the side of the sear and thereby locking the firing-pin head (and through this the bolt itself) against rotation, so long as the firing-pin is in the half-cock position. By this means the bolt is securely locked against any rotary unlocking movement, and the "safety" of the gun assured as against firing by the turning of the bolt. The firing-pin head is also shown provided with a safety-stop, 96, which, on the cocking of the gun by hand, by coming in contact with said catch 96' on the gun-frame G, as shown in Fig. 8, prevents the withdrawing of the firing-pin head farther than its normal stroke, thereby preventing excessive compression of the firing-spring. Said fixed stop on the gun-frame also constitutes a safety-stop for preventing the firing-pin head from being blown back out of the bolt on the firing of defective cartridges or the puncturing of a cartridge-cap. On the turning of the reciprocating bolt to unlock the same preparatory to retracting the bolt, the stop 96 of the firing-pin head, said head being fitted to turn with the bolt and slide in the same, is turned out of alignment with the fixed stop so as to pass said fixed stop and not interfere with the reciprocatory movement of the bolt-mechanism.

The firing-pin is locked into engagement with the firing-pin head E by means of a coupling-piece, D, which has therein the slot 11 for engaging the flatted and notched rearward end (see Figs. 31 and 33) of the firing-pin. In the preferred form thereof herein shown, said firing-pin coupling D has at the forward end thereof the oppositely-disposed lugs 12 and 12' set crosswise to said end-lugs. In the rearward end of the firing-pin head E is formed a socket for receiving said coupling-piece D. Said socket has the inwardly-projecting flanges 14, whose opening is shaped to permit the passage through it of the end-lugs 12 and 12' of the coupling D. Beyond said flange 14 the firing-pin head is enlarged at 15 to permit of the rotation of the said end-lugs within it. The coupling being inserted with its end-lugs through said flange-opening at 14, is then rotated until its second lugs 13 and 13' also pass into the opening of said flange 14; said end-lugs 12 and 12' of the coupling then rest against the inner surface 16 of the firing-pin head E, and the lugs 13—13' closely fit said opening in the flange 14. By this means, the coupling (so long as it is drawn forward into the position shown in Figs. 23 and 24) is rigidly locked in place against rotation relatively to the bolt. The firing-pin engaging said coupling-piece in the positive manner described, and the coupling being positively locked as set forth with the firing-pin head, the firing-pin is then positively rotated, with its said head, (this being rotated by the bolt,) to turn the firing-pin relatively to the aforesaid retracting-cam of the bolt-head B, thereby bringing the firing-pin to its proper rotative position at the proper time for the firing of the gun, and also turning said pin to retract the same while the bolt-mechanism is unlocked or drawn back. Said firing-pin coupling is held normally in the position shown in Figs. 23 and 24, in its locked position, by the action of the firing-pin-spring 17, which, re-acting against the shoulder 18 of the bolt, acts against the stop-flanges 10 and 10' (and the rearward ends of the bearing-cams 9 and 9') to normally draw the bolt and the coupling forward within the firing-pin head and thus maintain the locking engagement of said parts.

The sear-mechanism, shown assembled by itself in Figs. 53 and 54, consists of the sear, designated in a general way by O; a trigger, P, engaging with the sear; the sear-supporting shaft 34; the bearing-plate R, and the sear-spring T. The sear is shown with a square opening, 70, (see Fig. 61,) fitting a corresponding square portion, 70', of the sear-shaft 34; it has a pin-hole, 71, and a slot, 71' (Figs. 60 and 61) for receiving the rearward end of the bearing-plate R, this being connected to the sear by the pin 72 (Fig. 53) and its forward end resting upon the lower arm 72' of the ejector N. In the rearward end of the sear, below the catch 23 thereof, is formed the socket 30' (Fig. 61) in which engages the correspondingly-shaped forward end of the arm 30'' of the trigger P, which is shown having two bearings, 73 and 73', that come against the under side 73'' of a portion of the receiver or frame, G, of the gun. See Figs. 3, 5, 7 and 8. The lower end, or finger-piece, 29, of the trigger extends downward through a slot in the upper side 29' of the guard, and stands within the usual space within the trigger-guard 29''. When the gun is made ready for firing, as in Fig. 8, the forward bearing 73 of the trigger rests against the receiver or frame 73'', giving a relatively powerful action for starting the sear; when this is drawn nearly off from the catch 25 of the firing-pin head, the second trigger-bearing 73' comes against the gun-frame, giving an increased resistance, acting after the manner of a stop, and on the further movement of the trigger disengaging the sear from said firing-pin catch. The sear-spring T is supported at its lower end on the trigger-guard, as shown in the sectional views Figs. 3, 6, 7 and 8, and at its upper end bears against the under side of the bearing-plate R at such a point in the length thereof (substantially as shown) as will properly distribute the force of the spring between the sear and the ejector, this requiring a free action and only a small amount of power for its operation.

When the sear stands in the relief-notch 33' of the firing-pin head, as indicated by dotted lines in Fig. 3, the rear end of the safety-bolt 36 stands just forward of the bolt-arm, in line with the hole 75 in said arm when the bolt is in position for firing. The parts being thus positioned relative to each other, the first downward movement of the sear, acting through the shaft or pin 34 and the arm 34' hereinbefore described, throws back said safety-bolt 36, which immediately engages with the bolt-arm and rigidly locks this against movement during the disengagement of the sear from the firing-pin head. Said head being thrown forward by the firing-pin spring to the position in Fig. 9, the relief-notch 33' of said head comes over the point of the sear, which is thus permitted to be elevated by its actuating-spring, and operates, through the aforesaid connecting parts 34 and 34', to withdraw the safety-bolt from its engagement with the bolt-arm. The bolt being thus unlocked, is now free to be turned from its position in Fig. 9 to that shown in Fig. 6, ready to be drawn back.

The safety device described, consisting of the safety-bolt 36 and its actuating-means operable from the sear, operates to lock the bolt-arm, whether the firing-pin be forward as in Fig. 3, or whether it be drawn back to the full-cock position as in Fig. 8. The engagement of the safety-bolt 36 with the bolt-arm being by means of the hole 75 is said arm, any upward movement of said arm carries said hole 75 out of line with the safety-bolt so that on pulling upon the trigger the sear and its connecting devices throw the safety-bolt against the forward side or face 86 (Figs. 5, 8 and 9) of the bolt-arm, and thus interposes an effective stop against the further movement of the sear. By this means the firing of the gun is effectually prevented except when the bolt is fully turned to its normal firing-position.

The ejector, designated in a general way by N, and shown in detail in Figs. 64 and 65, is in the form of a lever supported on the sear-shaft 34 so that its point 62, on the retraction of the bolt, runs in the sear-channel 26 in the lower side of the bolt, and in the grooves 26' and 63 on the under side of the bolt-head. See the sectional view, Fig. 6. The force of the spring T, transmitted through the bearing-plate R, normally holds the upper end of the ejector against the bolt, and when the bolt is withdrawn nearly to its rearward position throws the point of the ejector upward into the groove 63 of the bolt-head, as illustrated in Fig. 7, so as to strike the cartridge-head fairly and at a point near the lower edge thereof.

Besides carrying the sear and the ejector, the sear-shaft 34 is furnished with the safety-bolt-actuating arm 34', whose upper end engages in a notch at 35 (Figs. 56 and 57) formed in one side of said safety-bolt. The shaft-arm 34' works in a slot, 34'', Figs. 18, 19 and 21, formed in the side of the receiver, the extent of said slot being indicated by the dotted line $w$, Fig. 19. When assembling these details, the sear, trigger and bearing-plate, together with the ejector placed against the side of the sear, are slipped into the mortise 74 of the receiver of the gun, the safety-bolt 36 is slipped into the hole 75' (Fig. 21) and the sear-shaft is slid into its bearings 76 and 76', Figs. 18 and 19, with its arm 34' in the position shown by dotted lines $x$ in Fig. 19; after this, the shaft is pushed into place, and turned to bring its arm 34' into the aforesaid slot 34'' and the upper end of said arm into engagement with the said notch 35 of the safety-bolt, the parts now assuming the position shown in Figs. 3 and 53. It will be understood that the safety-bolt is slid into place during the turning of the shaft-arm upward toward its normal position shown in Fig. 3, so as to bring the lever properly into the notch, in a manner which will be understood by comparison of the figures of drawings with the preceding description. When thus assembled, the sear mechanism is held in place by the wall 34''' of the receiver extending downwardly outside of the sear-shaft arm. The parts are disassembled by a reversal of the operations here described.

The magazine, designated in a general way by I, consists of two principal parts, one being designated in a general way as the shell, or casing, the other as the core, or follower. The casing consists of the outer shell, or wall, 65, having integral therewith the front end-wall, or disk, 65', and has projecting inwardly therefrom the collar, or circular cartridge-bearing, for supporting the forward end of the cartridge. At its larger end the shell engages with the outer edge of the disk, or head, 66, of the follower, this having a central core, or tube, 66', reaching forward to the casing-head 67, and being held thereto by means of the assembling-screw K. This screw is shown formed hollow for the passage through it, as hereinbefore mentioned, of the cleaning-rod 68.

In one side of the magazine-casing 65 is an opening, or slot, at 69, (Figs. 66, 69 and 70) for the entrance and exit of the cartridges, these being guided by the inwardly-projecting longitudinal flange 69' of the casing; which flange guides the cartridges downwardly onto the aforesaid collar, or cartridge-way, 69'', of the forward head or end-wall of the magazine; and guides the rearward ends of the cartridges onto the corresponding cartridge-way 69''' on the rearward end-wall of the magazine.

The spring L for forcing out the cartridges is a coiled spring carried on the outside of the core or tube 66' between the aforesaid cartridge-ways 69'' and 69''', and inside of the circular layer of cartridges lying upon said ways.

The cartridges are delivered by the magazine into the passage-way 90 of the receiver at a sufficient height to be engaged by the forward end of the bolt (see Fig. 7) which on its forward movement forces the point of the cartridge against the usual incline formed in the receiver at 99, for lifting and guiding the cartridge into the bore of the gun-barrel S.

According to my present improvements, the complete magazine, when assembled for use, comprises only two operative parts, the magazine-casing-and-core, and the spring. Also, the spring is not inclosed in any chamber, and is therefore accessible so far as necessary to prevent the choking of the same by any accumulation of dirt, which, it will be remembered, is a serious objection to those cylindrical or conical cartridge-magazines in which there is a separate cartridge-carrier, and in which the spring is inclosed within a chamber so as not to be readily accessible.

As a means for holding the magazine-supply of cartridges in reserve, the magazine is made shiftable to carry the discharge-opening 69 of the magazine out of alignment with said passage-way 90 of the receiver. This feature will be understood by comparison of the two views, Figs. 66 and 67, in the former of which the magazine is shown in position for operation, while in the latter, Fig. 67, the magazine is shown turned or shifted part way around, carrying the discharge-opening thereof to one side of the cartridge passage-way 90, thereby cutting off the passage of the cartridges out of the magazine.

The rotary magazine, together with the assembling-screw K thereof, is centrally perforated as hereinbefore set forth, for the purpose of extending the bore which extends through the fore-stock of the gun for receiving the cleaning-rod 94. This rod, shown in Figs. 8 and 3, is of the ordinary description, except that its length is greater than the length of the gun-barrel, so that the gunner may, in cleaning the barrel, force the wiper entirely through the bore and still retain firm hold of the opposite end of the cleaning-rod. The extra length, or point, 93, of the cleaning-rod 94 extends through the bore 68 of the assembling-screw and into the interior space 82' of the magazine, as will be understood from Figs. 9, 8 and 3.

The magazine-casing, by means of some suitable construction substantially as described, is provided at one end thereof with a circular support for the heads of the cartridges and at the other end thereof with a similar support for the points of the cartridges; and the revolving spring-actuated cartridge-feeding device is contained within the casing between said cartridge-supports. Said cartridge-feeding device may be considered as consisting of a suitable arm or bar, as for instance, the bar L', Figs. 67 and 70, carried by, or constituting a part of, the spring L whereby said feeding-device is spring-actuated.

For the purpose of removing the bolt-mechanism from the receiver, (as well as for permitting the bolt to turn relatively to the bolt-head in operating the gun,) the bolt-head is made severable from the bolt, and means are provided for permitting the turning of the bolt-head at a particular point in its longitudinal movement (whereby the projection 51 of the bolt is withdrawn into the slot 95) for disengaging said head from the bolt, whereby the latter may be drawn back out of the receiver, and afterward the bolt-head removed laterally from the receiver. For these purposes, the left-hand wall of the receiver G is shown having therein the recesses, or notches, 50 and 95, into which the projection 51 (in this case formed on the extractor) is carried by the turning of the bolt into said recess 50; this turning movement being permitted by the opposite recess or notch, 50', into which the projecting hook 51' of the extractor-lock enters.

When it is required to disassemble the bolt-mechanism, this is drawn back to bring the bolt-head to the position indicated by dotted lines $g'$ $h'$ in Fig. 16. The bolt-head is then turned over to the position indicated in the sectional view, Fig. 17, the dotted line $g'$ $h'$ being vertical, when the bolt may be drawn directly back out of the gun; after which the bolt-head is readily taken out of its place through the side-opening of the receiver. By this means the mechanism may be quickly removed and replaced without the use of any tools, and when the gun is assembled the two parts of the bolt-mechanism are safe from accidental separation.

When, in using the gun, the bolt is moved forward, the point 62 of the ejector stands within the so-called "sear-groove" 26 of the bolt F, and when the bolt gets to its forward position the space or recess 100 (see Figs. 3 and 8), at one side of said sear-groove receives the point of the ejector 62 on the turning of the bolt to its locked position.

When the mechanism is made ready for firing, the firing-pin and sear being in the position shown in Figs. 8 and 79, the first movement of the trigger draws down the sear (by means of the sear-shaft and its lever-arm), and throws back the safety-bolt 36 into engagement with the arm 98 of the main-bolt F, thus locking said main-bolt closed, as in Figs. 3 and 5. The further movement of the trigger withdraws the sear-point 23 from its engagement with the full-cock notch 25, thereby allowing the firing-pin spring 17 to throw the firing-pin C forward to the position shown in Figs. 3 and 9. At this time the sear-point stands immediately below the firing-pin head, at 33', some distance rearward of the half-cock notch 87, as shown in Fig. 3. In order to permit the elevation of the sear-point 23 and thus operate the connecting-shaft 34 and lever 34' to withdraw the safety-bolt 36 from its engagement with the main-bolt F, the firing-pin head is cut away or shaped as at 33, thus providing a space into which the sear-point may project on its upward or return movement. By this means, the releasing of the trigger and sear, after the firing of the gun, operates to disengage the safety-device described and leaves the bolt F ready for its rotary unlocking movement; this movement being, as hereinbefore described, from its position in Fig. 9 to that in Fig. 6. During this unlocking movement the surface at 33' of the firing-pin head said surface (being eccentric or cam-shaped as shown) forces down the sear so that on the retraction of the bolt the sear rides over the lower surface of the firing-pin head E, and springs up into the sear-groove 26 shown in the under side of the bolt, as illustrated, for instance, in Fig. 6.

On the forward movement of the bolt, the sear stands in said sear-groove until it engages the firing-pin head immediately over the catch or rim 27 thereof, and holds back said head during the remainder of the forward movement of the bolt, thereby cocking the gun, as illustrated in Figs. 77 and 79.

The general operation of my improved magazine-gun is as follows: On loading the magazine with cartridges, these being forced downward through the receiver (after the well-known manner of loading magazines from cartridge-holders or clips) the cartridges force back the carrier L as indicated in Fig. 20; and the action of the spring, when the loading operation is finished, drives forward the cartridges until the last one put in stand in the opening 90 of the receiver, as indicated in Fig. 20, ready to be carried forward by the bolt-mechanism. It will, of course, be understood that, prior to loading the magazine as stated, the bolt is first unlocked and then drawn back to the position indicated in Fig. 7. The magazine being supplied as set forth, the bolt-head, on the forward movement of the bolt, engages the head of the cartridge and carries the same forward into the barrel S of the gun to about the position shown in Fig. 6, bringing the rearward end of the side-wing 101 into position for engaging the cam 92' of the receiver, so that on turning the bolt over toward the right, said cam forces forward the bolt-mechanism to its fully-closed position, and said wing locks the same against rearward movement. During said forward movement of the bolt, the sear, by engaging the forward end of the firing-pin head, will have retracted the firing-pin, and on the rotary locking-movement of the bolt and said firing-pin head, the safety-flange 27 is carried to one side of the sear, leaving the gun cocked ready for firing. The gun having been thus loaded and made ready for firing, the gunner pulls back on the trigger 29 to draw down the sear, and in doing this operates (as hereinbefore stated) the safety-bolt 36 to engage the same with the arm 98 of the main-bolt F, thereby positively locking said main-bolt closed. On the further movement of the trigger, the sear is withdrawn from the full-cock notch 25, thus allowing the firing-pin-spring 17 to throw forward the firing-pin against the head of the cartridge, as indicated in Fig. 9. During the rotary locking-movement aforesaid of the bolt F, the firing-pin is turned, as hereinbefore set forth, to bring its cam-bearings in alignment with the deeper portion of the retracting-cam A of the bolt-head B, so as to permit the firing-pin to go forward sufficiently far to strike the cartridge. The gun having been fired, the gunner releases the trigger, thereby permitting the spring T to elevate the sear and retract the safety-bolt 36, after which (by means of the handle 98) the bolt F is first unlocked, (during this movement, by means of the described cams 91 and 91', starting the cartridge from the barrel as indicated in Fig. 6,) and is then quickly drawn back its full stroke; the point of the ejector 62, just before the end of said backward stroke, (one of the extractors being disengaged from the cartridge-head as hereinbefore described,) strikes the head of the cartridge-shell and forcibly ejects the same from the gun, as illustrated in Figs. 7 and 10. The old shell having been thus disposed of, and the bolt-head having been drawn back to a point rearward of the magazine, the uppermost cartridge in the magazine is forced upward by the magazine-spring into position for being taken by the bolt-mechanism and carried forward into the barrel, and then fired and extracted, as hereinbefore described; these operations continuing until the supply of cartridges is exhausted.

Having thus described my invention, I claim—

1. In a breech-loading gun, the combination with a rotary-reciprocating bolt and non-rotating bolt-head carried thereby, of an extractor carried upon the bolt-head longitudinally thereof, an extractor-cam operable substantially as set forth for throwing out and releasing the extractor, and means on the bolt for engaging the extractor-cam to actuate the same for releasing the extractor, substantially as described.

2. In a breech-loading gun, the combination with a rotary-reciprocating bolt, and a non-rotating bolt-head carried thereby, of an extractor carried by the bolt-head longitudinally thereof, an extractor-lock operable substantially as set forth for locking one of the extractors, and means on the bolt for actuating the extractor-lock to engage the same with the extractor, substantially as described.

3. In a breech-loading gun, the combination with the bolt constructed in two parts, of which one part is adapted to be turned relatively to the other part, of the extractor, an extractor-cam operable for throwing out and releasing the extractor, means for operating the cam to throw the extractor outward, and means on the rotary part of the bolt constructed to engage and retract the cam for releasing the exractor, whereby the extractor, when thrown outward, is released on the locking movement of the bolt, substantially as described.

4. In a breech-loading fire-arm, the combination with the reciprocatory bolt, of two co-acting extractors, and an extractor-actuator carried on the bolt and operating one of the extractors, whereby the cartridge is withdrawn from the barrel by both extractors and afterward released from one of the extractors, substantially as described.

5. In a breech-loading gun, the combination with the reciprocatory bolt, of the two oppositely-disposed extractors, and the combined extractor cam-and-lock constructed and operating on one movement thereof to lock one of the extractors, and on the other movement thereof to release the first extractor and throw out the other extractor, substantially as described.

6. In a breech-loading gun, the combination with a receiver adapted for carrying a longitudinally-reciprocating bolt-mechanism, and having thereon a cam for operating in one direction the extractor-cam of the bolt-mechanism, of the rotary-reciprocating bolt having a non-rotating head furnished with two extractors, the extractor cam-and-lock arranged to be turned in one direction (on the retraction of the bolt-mechanism) by the aforesaid receiver-cam, and a part on the bolt engaging the extractor-cam to reversely operate the same on the locking movement of the bolt in its forward position, substantially as described.

7. In a breech-loading gun, the combination with a reciprocatory bolt-mechanism carrying two extractors, of the extractor-actuator carried by said mechanism and operable for throwing out one of the extractors, the ejector, and means for actuating the extractor-actuator to throw out the extractor previous to the cartridge striking the ejector, substantially as described.

8. In a bolt-mechanism, the combination with a bolt-head carrying an extractor and having therein a guide-way transversely to the bolt, of the extractor-lock movable in said guide-way, and constructed when moved in one direction to lock the extractor, and when moved in the other direction to unlock the extractor, substantially as described.

9. In a bolt-mechanism, the combination with a bolt-head carrying the spring-extractor and having therein a guide-way substantially as described, of an extractor-actuating cam movable in said guide-way and constructed when moved in one direction to throw the extractor into an inoperative position, and when moved in the other direction to release the extractor and permit the same to resume its operative position, substantially as described.

10. In a bolt-mechanism, the combination with a bolt-head carrying two oppositely-disposed extractors and having a transverse guide-way between said extractors, of the combined extractor-lock and extractor-actuator fitted to slide in said guide-way and constructed on one movement thereof to unlock one extractor and throw the other extractor into its inoperative position, and on the other movement thereof to lock the first extractor in its operative position and release the second extractor from its inoperative position, substantially as described.

11. In a bolt-mechanism, the combination with the bolt bored for receiving the stem of the bolt-head, and having a catch for engaging a projection of the bolt-head, of the bolt-head having a stem adapted to turn in said bore, and having a projection engaging said bolt-catch, and an extractor-carrying ring carried upon the bolt-head stem forward of the bolt, and provided with one or more extractors, substantially as described.

12. In a bolt-mechanism, the combination with the bolt constructed for engaging the bolt-head substantially as set forth, of the bolt-head revolubly supported in the bolt and adapted to be turned from and into engagement with the bolt, means for normally preventing the rotation of the bolt-head when the bolt-mechanism is assembled in the gun, one or more extractors carried on the bolt-head, and an extractor-actuator carried on the bolt-head and operable by the turning movement of the bolt relatively to the bolt-head, substantially as set forth.

13. In a bolt-mechanism, the combination with the normally non-rotationg bolt-head, of the extractor 57' on said head, the extractor-lock shiftable from and into engagement with said extractor, and a rotary-reciprocating bolt adapted for carrying the bolt-head and constructed to engage the extractor-lock for closing the same on the rotary movement of the bolt in one direction, substantialy as described.

14. In a bolt-mechanism, the combination with the bolt-head, constructed substantially as described for carrying a pair of extractors, and having the circumferential guide-way enlarged on one side thereof between the extractors, and under-cut as set forth on the other side thereof between the extractors, of the combined extractor-lock and extractor-actuator movable in said under-cut guide-way and constructed, (when the extractors are removed from the bolt-head,) to be slid around the bolt-head and removed through the widened portion of the guide-way, whereby said combined lock-and-actuator is retained in place by the extractors, substantially as described.

15. In a breech-loading gun, the combination with a receiver adapted for carrying a longitudinally-reciprocating bolt-mechanism and having thereon a cam for operating (in one direction) the extractor-cam of the bolt-mechanism, of the rotary-reciprocating bolt provided with a non-rotating bolt-head, an extractor carried upon the bolt-head longitudinally thereof, a rotary-reciprocating extractor-cam carried by the bolt-head, and means on the bolt for actuating the extractor-cam in a direction opposite to the said receiver-cam, whereby said extractor-cam is operated in one direction on the retraction of the bolt-mechanism and in the other direction by the turning of the bolt, substantially as described.

16. In a breech-loading gun, the combination with the receiver adapted for carrying the longitudinally-reciprocatory bolt-mechanism, of the reciprocating bolt adapted to have a rotary unlocking movement and carrying the non-rotating bolt-head provided with a firing-pin-retracting cam, the firing-pin constructed for engaging said cam on the turning of the firing pin in the bolt-head, and means for turning the firing-pin with the bolt, whereby the firing-pin is retracted by said cam on the rotary unlocking-movement of the bolt, and the firing of the gun thereby prevented until the bolt is turned to its locked position, substantially as described.

17. In a breech-loading gun, the combination in the bolt-mechanism thereof, with a rotary-reciprocating bolt and non-rotating bolt-head provided with a retracting-cam substantially as described, and having the stop-face for limiting the forward movement of the firing-pin, of the firing-pin constructed to engage said stop-face for limiting its forward movement and having a cam-bearing constructed for engaging said retracting-cam to retract the firing-pin through the turning thereof within the bolt-head, substantially as described.

18. In a breech-loading gun, the combination with the bolt-mechanism, having a severable head furnished with a guide-projection on one side thereof, and with the receiver having the groove for said projection, and having said groove widened at one point in its length to form a recess for said projection, of the longitudinally-and-rotary-reciprocating bolt adapted to be turned from and into locking engagement with the receiver, and constructed for engaging the severable head when the bolt is unlocked, whereby said head is operated by the bolt longitudinally, and may be turned to carry its said projection into said recess and the head out of engagement with the bolt, for effecting the separation of the two parts of the bolt-mechanism, substantially as described.

19. In a bolt-mechanism, the combination with the bolt having the longitudinal segmental opening in one side of and at the rearward end thereof, of the spring-actuated firing-pin longitudinally movable in the bolt, and the firing-pin head having on one side thereof an enlargement fitted to slide in said side-opening, said firing-pin head being constructed, when this is retracted beyond its normal stroke and turned relatively to the bolt, to engage the rearward end of the bolt, whereby the firing-pin may be withdrawn to and held in an inoperative position, substantially as described.

20. In a bolt-mechanism, the combination with the bolt having the longitudinal segmental opening in one side of and at the rearward end thereof, and having at its rearward end opposite to said opening a firing-pin-head-engaging notch or recess, of the spring-actuated firing-pin longitudinally movable in the bolt, and the firing-pin head having on one side thereof an enlargement fitted to slide in said side-opening and having at the forward end of said enlargement a catch adapted for engaging said bolt-notch or recess, whereby the firing-pin, when its head is retracted beyond its normal stroke and turned relatively to the bolt, may be locked in an inoperative position, substantially as described.

21. In a breech-loading gun, the combination with the longitudinally-reciprocatory bolt, and with the sear, of the firing-pin, and the firing-pin head movable longitudinally of the bolt and rotary therewith substantially as set forth, and having at one end thereof the full-cock notch, and adjacent to said notch having a safety-catch adapted, when the firing-pin is in the full-cock position and the bolt is turned out of its locked-position, to engage the sear for preventing the firing of the gun, substantially as described.

22. In a breech-loading gun, the combination with the receiver adapted for carrying the longitudinally-reciprocatory bolt-mechanism, and with the sear, of the reciprocating bolt adapted to have rotary locking and unlocking movements, the firing-pin, and the firing-pin head movable longitudinally of the bolt and rotary therewith substantially as set forth, and having the full-cock notch, and rearward of said notch having the half-cock notch constructed for engaging the end and also the side of the sear, whereby the sear when the firing-pin is at the half-cock position is locked against action, and whereby the sear at the same time locks the firing-pin head and bolt against rotation, substantially as described.

23. In a breech-loading gun, the combination with the receiver adapted for carrying the longitudinally-reciprocatory bolt-mechanism, and with the sear, of the reciprocating bolt adapted to have rotary locking and unlocking movements and carrying the non-rotating bolt-head provided with a firing-pin-retracting cam, the spring-actuated firing-pin carried by the bolt and constructed for engaging said cam on the turning of the firing-pin in the bolt-head, the firing-pin head constructed for longitudinal movement in the bolt and normally partaking of the rotary movements of the bolt, and having on the forward end thereof the full-cock sear-catch, and at one side of the full-cock sear-catch having the sear-engaging flange or notch, and means for simultaneously turning the bolt and firing-pin relatively to the bolt-head, whereby, when the bolt is turned with the firing-pin at full-cock, said pin is turned to its safety-position relatively to the bolt-head cam simultaneously with the locking of the sear against action by said catch or flange on the firing-pin head, substantially as described.

24. In a breech-loading gun, the combination with the receiver adapted for carrying the longitudinally-reciprocatory bolt-mechanism, and with the sear and the safety-bolt connected and operating therewith, of the longitudinally-reciprocating bolt adapted to have rotary locking and unlocking movements, the firing-pin, and the firing-pin head movable longitudinally of the bolt and rotary therewith substantially as set forth, and having adjacent to the sear (when the bolt is closed and locked) its surface cut away, for permitting the operation of the sear to withdraw said safety-bolt out of engagement with the main-bolt, whereby after the firing of the gun the main-bolt is unlocked by the releasing of the trigger and sear, substantially as described.

25. In a breech-loading gun having a longitudinally - reciprocating bolt - mechanism comprising a rotary-reciprocating main-bolt, of the sear, and a safety-bolt connected for operation simultaneously with the sear and constructed to engage the bolt on the first movement of the sear, whereby the main-bolt is locked against rotary movement before the disengagement of the sear from the firing-pin of the bolt-mechanism, substantially as described.

26. In a breech-loading gun, the combination with a longitudinally-reciprocating bolt-mechanism comprising the rotary-reciprocating main-bolt, of the sear, the safety-bolt, and a shaft and lever operating said bolt from the sear, the main-bolt having a stop-face, interrupting the safety-bolt on the first rotary unlocking movement of the main-bolt for preventing the premature firing of the gun, substantially as described.

27. In a gun, the combination with the sear and with the ejector both pivotally supported substantially as described, of the ejector similarly supported, a bearing-plate pivotally supported at one end upon the sear and at the other bearing upon the ejector, and a spring acting against said plate, whereby the force of the spring is transmitted to both the ejector and the sear, substantially as shown and described.

28. In a breech-loading gun, the combination with a receiver adapted substantially as described for carrying the longitudinally-reciprocating bolt-mechanism comprising the rotary-reciprocating main-bolt, and having a bore, 75', for carrying a safety-bolt, of the rotary-reciprocating and longitudinally-reciprocating main-bolt, the safety-bolt carried in said receiver-bore 75', the sear-shaft operatively connected with said safety-bolt, and means for holding in place and actuating said shaft to throw the safety-bolt from and into engagement with the main-bolt, substantially as described.

29. In a magazine-gun, the combination with the receiver adapted for carrying a longitudinally reciprocating bolt-mechanism and having a cartridge passage-way underneath the path of said mechanism, of a cartridge-magazine substantially as described supported underneath the receiver with its discharge-opening normally coinciding with said cartridge passage-way, and means for shifting the magazine to carry its discharge-opening out of alignment with said passage-way and thereby hold the magazine-supply of cartridges in reserve, substantially as described.

30. In a magazine-gun, the combination with the receiver adapted for carrying a reciprocating bolt-mechanism, and for carrying a rotatory magazine, of the rotatory magazine located underneath the path of the bolt-mechanism, and having a discharge-outlet normally coinciding with the passage-way in the receiver, through which the magazine may be filled and emptied, and a shifting-arm connected with the magazine for turning the same to bring its discharge-opening out of and into alignment with the cartridge passage-way in the receiver, substantially as described.

31. In a magazine-gun, the combination with the receiver and with the barrel of the gun, of the centrally-perforated rotatory magazine carried by the receiver rearward of and below the line of the gun-barrel, said perforation being in a line with the passage-way in the stock of the gun, whereby space is obtained for carrying a cleaning-rod longer than the gun-barrel, substantially as described.

32. In a magazine for breech-loading guns, the combination with the outer shell having a central core and having supports for the heads and points of the cartridges constructed to hold the cartridges free of the central core, of the spiral spring carried upon the central core and constructed at its free end to engage the cartridges for carrying forward the same, substantially as described.

33. In a magazine for breech-loading guns, the combination with the outer shell having the discharge passage-way 69, the head 65' constructed for supporting the points of the cartridges, and the central core having the head 66 and constructed for supporting the heads of the cartridges, of a spring within the cartridge-chamber for carrying forward the cartridges, and means for holding the central core and its head into engagement with the outer shell and its head, substantially as described.

34. In a magazine for breech-loading guns, the combination with the outer shell having the discharge-outlet 69, the stop 69', and having the head constructed for supporting the points of the cartridges, of the central core and its head, and the spring carried upon the central core and constructed and operating for carrying the cartridges against said stop, said spring being accessible through the discharge-opening, substantially as described.

35. In a magazine-gun, the combination with a receiver adapted substantially as described for carrying the rotatory magazine and having in the cover thereof an opening for the shifting-arm of the magazine, of the rotatory magazine carried within the receiver and its cover, the shifting-arm fixed to the magazine and extending through said opening, and a detent engaging the receiver for holding the magazine in its operative or inoperative position, substantially as described.

36. In a magazine-gun, the combination with a receiver or framework substantially as described, having therein the opening for a shifting-arm, of a rotatory magazine substantially as described, and the shifting-arm J fixed to said magazine and extending through said opening and constructed subtantially as described for covering said opening, substantially as described.

37. In a breech-loading gun, and as a safety device therefor, the combination with the frame fitted for carrying a longitudinally-reciprocating bolt and having rearwardly of the bolt-bearing a fixed stop, of a longitudinal-and-rotary-reciprocating bolt, the firing-pin, and a firing-pin head longitudinally movable in the rearward end of the bolt and projecting therefrom and having a stop in position to be turned out of alignment with said fixed stop on the turning of the bolt to unlock the same, and standing in position forward of said fixed stop when the bolt is in its locked position.

38. In a magazine for breech-loading guns, the combination with a casing having a longitudinal opening in one side thereof and having a central core and a passage-way extending around said core to said opening, of a spring in said passage-way and adapted to bear against the cartridges therein for forcing the same through the passage-way to said casing-opening, substantially as described.

39. In a magazine for breech-loading guns, the combination with a casing having a cartridge passage-way therein and provided at one end thereof with a circular support for the heads of the cartridges and at the other end thereof with a circular support for the points of the cartridges, of a revolving spring-actuated cartridge-feeder within the casing between said cartridge-supports, substantially as described.

40. In a magazine-gun, the combination with a framework comprising a receiver adapted for carrying a reciprocating bolt-mechanism and having underneath the path of the bolt-mechanism a passage-way for the cartridges, and having underneath said passage-way an inclosed magazine-space, of a separate magazine removably inclosed in said space and comprising an exterior casing with a side-opening corresponding to said cartridge passage-way of the receiver, and means within the magazine for ejecting the cartridges therefrom into said receiver passage-way, substantially as described.

41. In a magazine-gun, the combination with the receiver adapted for carrying a reciprocating bolt-mechanism and having underneath the path of the bolt-mechanism a cartridge passage-way, of a magazine located below said receiver passage-way and comprising a casing having an opening in one side thereof and containing means for ejecting the cartridges therefrom, and the magazine-cover under the magazine and joining at its edges the lower edges of the receiver for inclosing the magazine, substantially as described.

MURRAY H. DURST.

Witnesses:
FRANCIS H. RICHARDS,
WILLIAM G. RICHARDS.